United States Patent
Yamamura et al.

(10) Patent No.: US 7,824,086 B2
(45) Date of Patent: Nov. 2, 2010

(54) LAMP UNIT FOR VEHICLE HEADLAMP AND VEHICLE HEADLAMP

(75) Inventors: Satoshi Yamamura, Shizuoka (JP); Takuya Kotajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 136 days.

(21) Appl. No.: 12/207,972

(22) Filed: Sep. 10, 2008

(65) Prior Publication Data

US 2009/0073712 A1    Mar. 19, 2009

(30) Foreign Application Priority Data

Sep. 13, 2007    (JP)    ............... 2007-237792

(51) Int. Cl.
*B60Q 1/00*    (2006.01)

(52) U.S. Cl. ............... 362/519; 362/520; 362/521; 362/509; 362/516

(58) Field of Classification Search ......... 362/519–522, 362/538, 509, 512, 516
See application file for complete search history.

(56) References Cited

U.S. PATENT DOCUMENTS

| | | | |
|---|---|---|---|
| 6,527,411 B1 * | 3/2003 | Sayers | 362/245 |
| 2004/0090602 A1 * | 5/2004 | Imade | 353/102 |
| 2005/0018443 A1 * | 1/2005 | Tsukamoto | 362/539 |
| 2005/0122735 A1 * | 6/2005 | Watanabe et al. | 362/539 |
| 2007/0109801 A1 * | 5/2007 | Panopoulos | 362/465 |

FOREIGN PATENT DOCUMENTS

| | | |
|---|---|---|
| EP | 1653150 A1 | 5/2006 |
| JP | 2005-317226 A | 11/2005 |
| JP | 2007-179969 A | 7/2007 |
| WO | 2006054225 A1 | 5/2006 |
| WO | 2007027474 A2 | 3/2007 |
| WO | 2007042552 A1 | 4/2007 |

OTHER PUBLICATIONS

Extended European Search Report for Application No. 08015931.2-1268, mailed on Mar. 10, 2009 (8 pages).
Patent Abstracts of Japan, Publication No. 2005-317226, Publication Date: Nov. 10, 2005, 1 page.
Patent Abstracts of Japan, Publication No. 2007-179969, Publication Date: Jul. 12, 2007, 1 page.

* cited by examiner

*Primary Examiner*—Sandra L O'Shea
*Assistant Examiner*—Evan Dzierzynski
(74) *Attorney, Agent, or Firm*—Osha Liang LLP

(57) ABSTRACT

A lamp unit for a vehicle headlamp includes a projection lens disposed on an optical axis extending in a longitudinal direction of a vehicle and a plurality of light source units disposed rearwards of a rear focal plane of the projection lens. Each of the light source units includes a light emitting device; and a light guiding member having a front end light output port and adapted to guide light from the light emitting device to the front end light output port so as to allow the light be emitted from the front end light output port. The front end light output ports of the light guiding members of the respective light source units are arranged adjacent to each other in a horizontal direction in a vicinity of the rear focal plane.

12 Claims, 10 Drawing Sheets

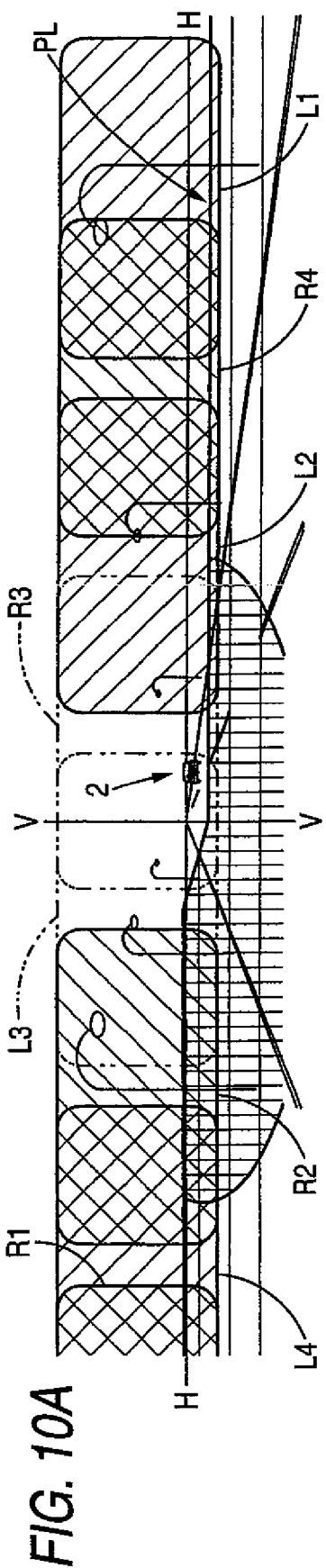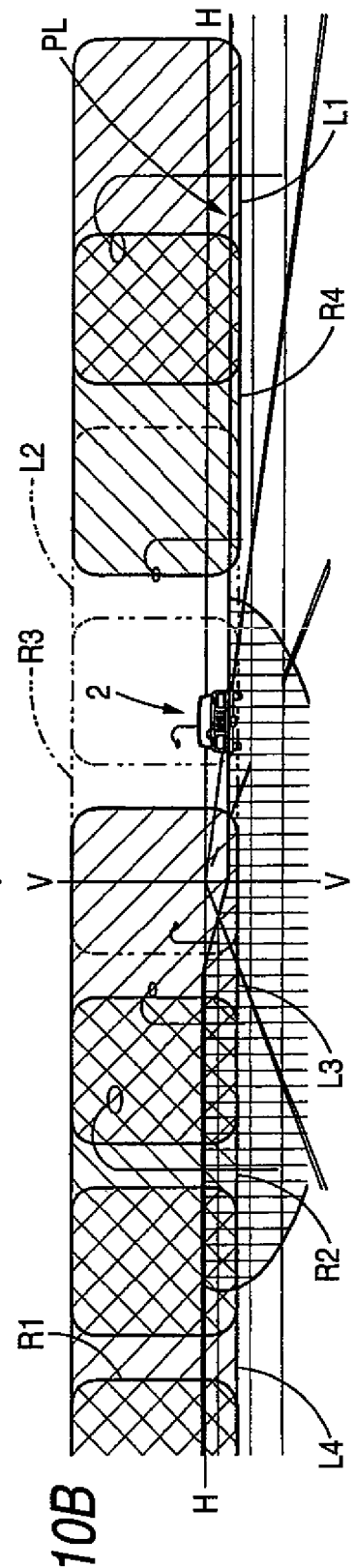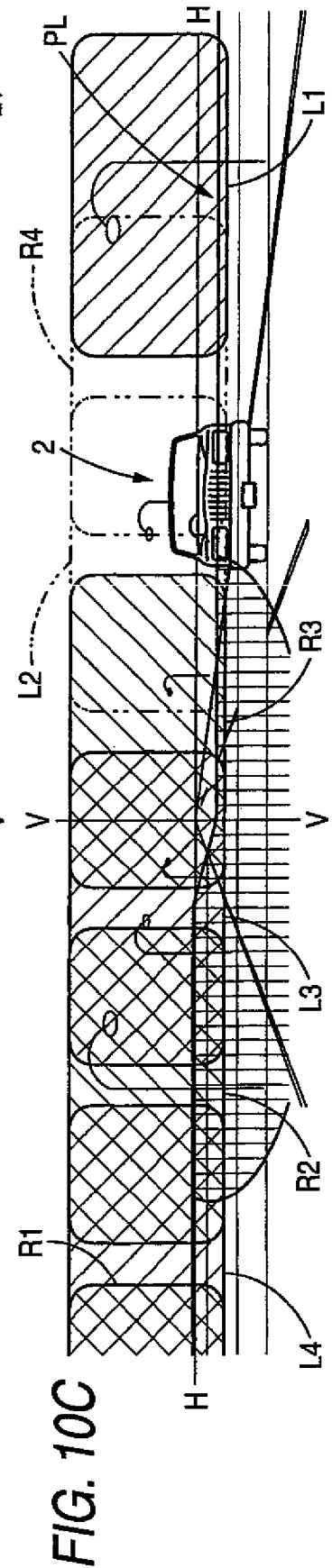

LAMP UNIT FOR VEHICLE HEADLAMP AND VEHICLE HEADLAMP

BACKGROUND OF THE INVENTION

1. Field of the Invention

The present invention relates to a lamp unit for a vehicle headlamp and more particularly to a projector type lamp unit including a plurality of light source units and a vehicle headlamp including the lamp unit.

2. Background Art

In general, in a projector type lamp unit used for a vehicle headlamp, a projection lens is disposed on an optical axis which extends in a longitudinal direction of a vehicle, and a light source is disposed further rearwards than a rear focal point of the projection lens, so that light from the light source is reflected by a reflector so as to be close to the optical axis.

As described in, for example, Patent Document No. 1 or Patent Document No. 2, there is known a projector type lamp unit like the one described above in which a light emitting device such as a light emitting diode is used as a light source thereof.

In a lamp unit described in Patent Document No. 1, a plurality of light source units each including a light emitting device and a reflector are disposed in a horizontal direction, and by combining together light distribution patterns or light distribution patterns formed by light from the respective light source units, a light distribution pattern of the vehicle headlamp of a light distribution pattern constituting part thereof is made to be formed.

On the other hand, in a lamp unit described in Patent Document No. 2, a plurality of light emitting devices are disposed in the vicinity of a rear focal plane of a projection lens thereof in such a manner as to be arranged adjacent to each other in a horizontal direction, and by combining together light distribution patterns formed as inverted projected images of the respective light emitting devices, a light distribution pattern of the vehicle headlamp of a light distribution pattern constituting part thereof is made to be formed.

Patent Document No. 1: JP-A-2005-317226

Patent Document No. 2: JP-A-2007-179969

In the lamp unit described in Patent Document No. 2 above, because the plurality of light distribution patterns are formed parallel in the horizontal direction, in the event that the respective light emitting devices are controlled to be illuminated or turned off so that, in the plurality of light distribution patterns, only the light distribution pattern which is to be formed in a position where an oncoming vehicle is present is made not to be formed sequentially, the visibility of a road surface ahead of the vehicle can be enhanced without giving glare to the driver of an oncoming vehicle.

However, because these light distribution patterns are formed as inverted projected images of light emitting chips of the respective light emitting devices, the resulting light distribution patterns reflect light emission irregularities inherent in the light emitting chips as they are. Because of this, it becomes difficult to form these respective light distribution patterns with substantially uniform brightness or having specific luminous intensity distributions.

On the other hand, in the lamp unit descried in Patent Document No. 1 above, because the respective light distribution patterns are formed as the inverted projected images of light source images formed on the rear focal plane of the projection lens by light emitted from the light emitting devices that is reflected by the reflectors of the respective light source units, it becomes possible to form these respective light distribution patterns with substantially uniform brightness or having specific luminous intensity distributions.

However, because the light distribution patterns formed by light from the respective light source units have unclear contours, even though the respective light source units are controlled to be illuminated or turned off so that only the light distribution pattern which is to be formed in a position where an oncoming vehicle is present is made not to be formed sequentially, light that forms circumferential edge portions of the light distribution patterns, which are situated on sides of the light distribution pattern that is made not to be formed, enters the eyes of the driver of an oncoming vehicle to dazzle him or her. Consequently, it becomes difficult to control the light source units to be illuminated or turned off in the way described above.

SUMMARY OF THE INVENTION

One or more embodiments of the present invention provide a lamp unit for a projector-type vehicle headlamp which includes a plurality of light source units, wherein light distribution patterns formed by light from the respective light source units are made to have clear contours, as well as substantially uniform brightness or specific luminous intensity distributions.

One or more embodiments of the present invention have various configurations of the respective lamp units.

Namely, according to an aspect of one or more embodiments of the invention, there is provided a lamp unit for a vehicle headlamp including a projection lens disposed on an optical axis which extends in a longitudinal direction of a vehicle and a plurality of light source units which are disposed further rearwards than a rear focal plane of the projection lens, wherein the light source units each includes a light emitting device and a light guiding member having a front end light output port of a predetermined shape and adapted to guide light from the light emitting device to the front end light output port so as to let the light be emitted from the front end light output port, and wherein the respective light source units are disposed in such a manner that the front end light output ports of the light guiding members of the light source units are arranged adjacent to each other in a horizontal direction in the vicinity of the rear focal plane.

The "light emitting device" means a device-like light source having a surface-emitting light emitting chip which is illuminated like a dot, and there is imposed no specific limitation on types thereof. For example, a light emitting diode or laser diode can be adopted.

The respective "light source units" are disposed in such a manner that the front end light output ports of the light guiding members of the light source units are arranged adjacent to each other in the horizontal direction in the vicinity of the rear focal plane. There is imposed no specific limitation on a vertical positional relationship between the front end light output ports of the light guiding members of the respective light source units with respect to the optical axis.

The expression above reading "are disposed in such a manner that the front end light output ports of the light guiding members of the light source units are arranged adjacent to each other in the horizontal direction" includes either of a form in which the light source units are disposed in such a manner that the front end light output ports of the light guiding members of the light source units are arranged close to each other in the horizontal direction and a form in which the light source units are disposed in such a manner that the front end light output ports of the light guiding members of the light source units are arranged spaced apart from each other in the horizontal direction.

There is imposed no particular limitation on the specific configuration of the "light guiding member," provided that the light guiding member is a member having the front end light output port of the predetermined shape and is made to guide light from the light emitting device to the front end light output port so as to allow light emission forwards from the front end light output port.

There is imposed no particular limitation on the specific shape of the "front end light output port" and, for example, shapes such as rectangle, parallelogram, and trapezoid can be adopted.

As is shown by the configurations that have been described heretofore, the lamp unit for a vehicle headlamp according to one or more embodiments of the invention includes the projection lens disposed on the optical axis which extends in the longitudinal direction of the vehicle and the plurality of light source units which are disposed further rearwards than the rear focal plane of the projection lens. Because each of the light source units includes the light emitting device and the light guiding member having the front end light output port of the predetermined shape and adapted to guide light from the light emitting device to the front end light output port so as to allow light emission from the front end light output port and the respective light source units are disposed in such a manner that the front end light output ports of the light guiding members of the light source units are arranged adjacent to each other in the horizontal direction in the vicinity of the rear focal plane, the following functions and advantages can be obtained.

Namely, while emanating light from each light source unit is made up of the light of the light emitting device which is guided to the front end light output port of the light guiding member, the light from the light emitting device is made to have a uniform light distribution or to have a specific light distribution by the optical action of the light guiding member. In addition, because the front end light output port of each light source unit is positioned in the vicinity of the rear focal plane of the projection lens, a light source image formed on the rear focal plane of the projection lens by the light from the light emitting device becomes an image having substantially uniform brightness or an image having a specific luminous intensity distribution. Consequently, each light distribution pattern that is formed as an inverted projected image of each light source image on the rear focal plane also becomes a light distribution pattern having substantially uniform brightness or a light distribution pattern having a specific luminous intensity distribution.

Because each light source image on the rear focal plane has substantially the same contour as that of the opening shape of the front end light output port of the light guiding member of each light source unit, the light distribution pattern that is formed as the inverted projected image thereof also becomes a light distribution pattern having a clear contour.

In this way, according to one or more embodiments of the invention, in the lamp unit for a projector type vehicle headlamp having a plurality of lamp units, the light distribution patterns formed by light from the respective light source units can be made light distribution patterns having clear contours, as well as substantially uniform brightness or specific luminous intensity distributions.

In addition, although a unit light distribution pattern formed by light emitted from the lamp unit for a vehicle headlamp according to the aspect of the invention becomes a light distribution pattern as a collection of light distribution patterns which are formed parallel in the horizontal direction by light from the respective light source units, in the event that the respective light source devices are controlled to be illuminated or turned off so that in the plurality of light distribution patterns which make up the unit light distribution pattern, only the light distribution pattern that is to be formed in a position where an oncoming vehicle is present is made not to be formed sequentially, the visibility of a road surface lying ahead of the vehicle can be enhanced without giving glare to the driver of an oncoming vehicle.

Note that it is possible to use the lamp unit for a vehicle headlamp according to such embodiments of the invention for applications other than the application in which the lamp unit is used in situations that the illuminating/turning off control is implemented (for example, an application in which a plurality of light source units are illuminated at the same time so as to form a unit light distribution pattern made up of a plurality of light distribution patterns formed by light from the plurality of light source units so illuminated).

In the configuration described above, in the event that a configuration is adopted in which the light guiding members of the light source units each include a tubular member which is formed in such a manner as to expand in a substantially conical shape from the front end light output port towards the rear and to an inner circumferential surface of which a mirror finish treatment is applied and an optical member which is disposed in the vicinity of a rear end portion of the tubular member for controlling the convergence of light from the light emitting device towards the front end light output port, the following functions and advantages can be obtained.

Namely, the light from the light emitting device can be guided to the front end light output port with good efficiency by the convergence control by the optical member and reflection control on the inner circumferential surface of the tubular member, and the emanating light from the front end light output port can be made to be incident on the projection lens with good efficiency, thereby making it possible to make effective use of the luminous flux of the light sources.

In addition, the luminous intensity distribution of the light source image formed at the front end light output port can be controlled in detail by adjusting suitably the degree of convergence of light from the light emitting device by the optical member, whereby the luminous intensity distribution of the light distribution pattern can also be controlled in detail.

In this case, there is imposed no particular limitation on the specific sectional shape and degree of expansion of the "tubular member," provided that the "tubular member" is a hollow member which is formed in such a manner as to expand into the substantially conical shape from the front end light output port towards the rear. In addition, there is imposed no particular limitation on the specific configuration of the "optical member," and, for example, a reflector or a lens can be adopted.

On the other hand, in the configuration described above, in the event that a configuration is adopted in which the light guiding members of the light source units each include a light transmissive member which is formed in such a manner as to expand in a substantially conical shape from the front end light output port towards the rear and an optical member which is disposed in the vicinity of a rear end portion of the light transmissive member for controlling the convergence of light from the light emitting device towards the front end light output port, the following functions and advantages can be obtained.

Namely, due to the convergence control by the optical member and the inner circumferential surface reflection control on an outer circumferential surface of the light transmissive member, the light from the light emitting device can be guided to the front end light output port with good efficiency and the emanating light from the front end light output port can be made to be incident on the projection lens with good efficiency, thereby making it possible to make effective use of the luminous flux of the light sources. In particular, because the outlet angle of light emanating from the light transmissive member is increased by the refracting action at the front end light output port, the resulting light is made difficult to be incident on the projection lens, and therefore, to cope with this, it is extremely effective to form the light transmissive member in such a manner as to expand into the substantially conical shape from the front end light output port towards the rear.

In addition, the luminous intensity distribution of the light source image formed at the front end light output port can be controlled in detail by adjusting suitably the degree of convergence of light from the light emitting device by the optical member, whereby the luminous intensity distribution of the light distribution pattern can also be controlled in detail.

In this case, there is imposed no particular limitation on the specific sectional shape and degree of expansion of the "light transmissive member," provided that the "light transmissive member" is a hollow member which is formed in such a manner as to expand into the substantially conical shape from the front end light output port towards the rear. In addition, there is imposed no particular limitation on the specific configuration of the "optical member," and for example, a reflector or a lens can be adopted. Furthermore, this "optical member" may be formed separately from or integral with the light transmissive member.

In the configuration described above, in the event that any of the front end light output ports of the light guiding members of the light source units are formed into a substantially rectangular shape and horizontal widths of the front end light output ports are set such that larger values are given thereto as the front end light output ports are positioned further apart from the optical axis, the following functions and advantages can be obtained.

Namely, on an imaginary vertical screen or aiming board disposed ahead of the vehicle, an oncoming vehicle changes its position either to the left or to the right from the front direction of the lamp as it is approaching the subject vehicle (for example, to the right in the case of the left-hand side traffic), and the degree to which the oncoming vehicle changes its position increases gradually as it approaches the subject vehicle.

Then, in the event that the horizontal widths of the front end light output ports are set such that larger values are given thereto as the front end light output ports are positioned further apart from the optical axis, only the light distribution pattern which is to be formed in a position where the oncoming vehicle is present can also be made not to be formed sequentially by controlling the respective light source units to be illuminated or turned off at equal time intervals or time intervals approximate thereto, whereby the light source unit illuminating/turning off control is facilitated.

In addition, by adopting the configuration described above, a light distribution pattern for illuminating a distant area on the road surface ahead of the vehicle can be made a light distribution pattern which has a small horizontal width and which is very bright, while a light distribution pattern for illuminating a near area on the road surface ahead of the vehicle can be made a light distribution pattern which has a large horizontal width and which is slightly bright, whereby the road surface ahead of the vehicle can be illuminated with appropriate brightness, thereby making it possible to enhance the visibility thereof further.

As a configuration of a vehicle headlamp including a lamp unit according to one or more embodiments of the invention, in the event that there is provided a vehicle headlamp including a lamp unit in which a plurality of light source units are disposed in such a manner as to be arranged horizontally across an optical axis, any of front end light output ports of light guiding members of the respective light source units are formed into a substantially rectangular shape, horizontal widths of the front end light output ports and horizontal widths of gaps between the front end light output ports are set to larger values as they are positioned further apart from the optical axis and are set to be in a horizontally symmetrical positional relationship with respect to the optical axis, and a lamp unit which has a shape horizontally symmetrical with the lamp unit with respect to the optical axis, wherein the respective lamp units are disposed in such a manner that directions of optical axes thereof are aligned with each other, the following functions and advantages can be obtained.

Namely, respective light distribution patterns which make up a unit light distribution pattern which is formed by light emitted from the other lamp unit can be fitted in gaps between respective light distribution patterns which make up a unit light distribution pattern which is formed by light emitted from one of the lamp units. In addition, by this configuration, the light source unit illuminating/turning off control is facilitated in which only the light distribution pattern that is to be formed in a position where an oncoming vehicle is present is made not to be formed sequentially, and a lamp light distribution pattern which is formed as a light distribution pattern in which the two unit light distribution patterns formed by light emitted from the two lamp units are combined or a light distribution pattern which constitutes part of the lamp light distribution pattern can be formed as a continuous horizontally elongated light distribution pattern having no dark portion.

On the other hand, as a configuration of a vehicle headlamp including a lamp unit according to one or more embodiments of the invention, in the event that there is provided a vehicle headlamp including two lamp units in which front end light output ports of light guiding members of respective light source units are formed into rectangular shapes whose sizes are substantially the same, wherein these respective lamp units are disposed in such a manner that directions of optical axes of the lamp units are each offset a predetermined angle in the horizontal direction, the following functions and advantages can be obtained.

Namely, in the lamp unit according to such embodiments of the invention, when the front end light output ports of the light guiding members of the respective light source units are not disposed in such a manner that the front end light outlets ports are arranged close to each other, gaps are formed between light distribution patterns formed by the respective light source unit.

In the event that there is provided a vehicle headlamp including two lamp units in which front end light output ports of light guiding members of respective light source units are formed into rectangular shapes whose sizes are substantially the same, wherein these respective lamp units are disposed in such a manner that directions of optical axes of the lamp units are each offset a predetermined angle in the horizontal direction, gaps between respective light distribution patterns which make up a unit light distribution pattern which is formed by light emitted from one of the lamp units can be covered by respective light distribution patterns which make up a unit light distribution pattern which is formed by light emitted from the other lamp unit. In addition, by this configuration, a lamp light distribution pattern which is formed as a light distribution pattern in which the two unit light distribution patterns formed by light emitted from the two lamp units are further combined or a light distribution pattern which constitutes part of the lamp light distribution pattern can be formed as a continuous horizontally elongated light distribution pattern having no dark portion.

In this case, there is imposed no particular limitation on the specific value of the "predetermined angle" at which the directions of the optical axes of the respective lamp units are each offset in the horizontal direction, provided that the "predetermined angle" is such that the gaps between the respective light distribution patterns which make up the unit light distribution pattern which is formed by light emitted from each lamp unit do not overlap each other.

Other aspects and advantages of the invention will be apparent from the following description, the drawings and the claims.

BRIEF DESCRIPTION OF THE DRAWINGS

FIGS. 10A, 10B, and 10C are enlarged views showing part of FIG. 9 for the purpose of explaining the details of a light source unit illuminating/turning off control according to the second embodiment of the invention.

DETAILED DESCRIPTION

Hereinafter, embodiments of the invention will be described with reference to the drawings.

Figure 1:
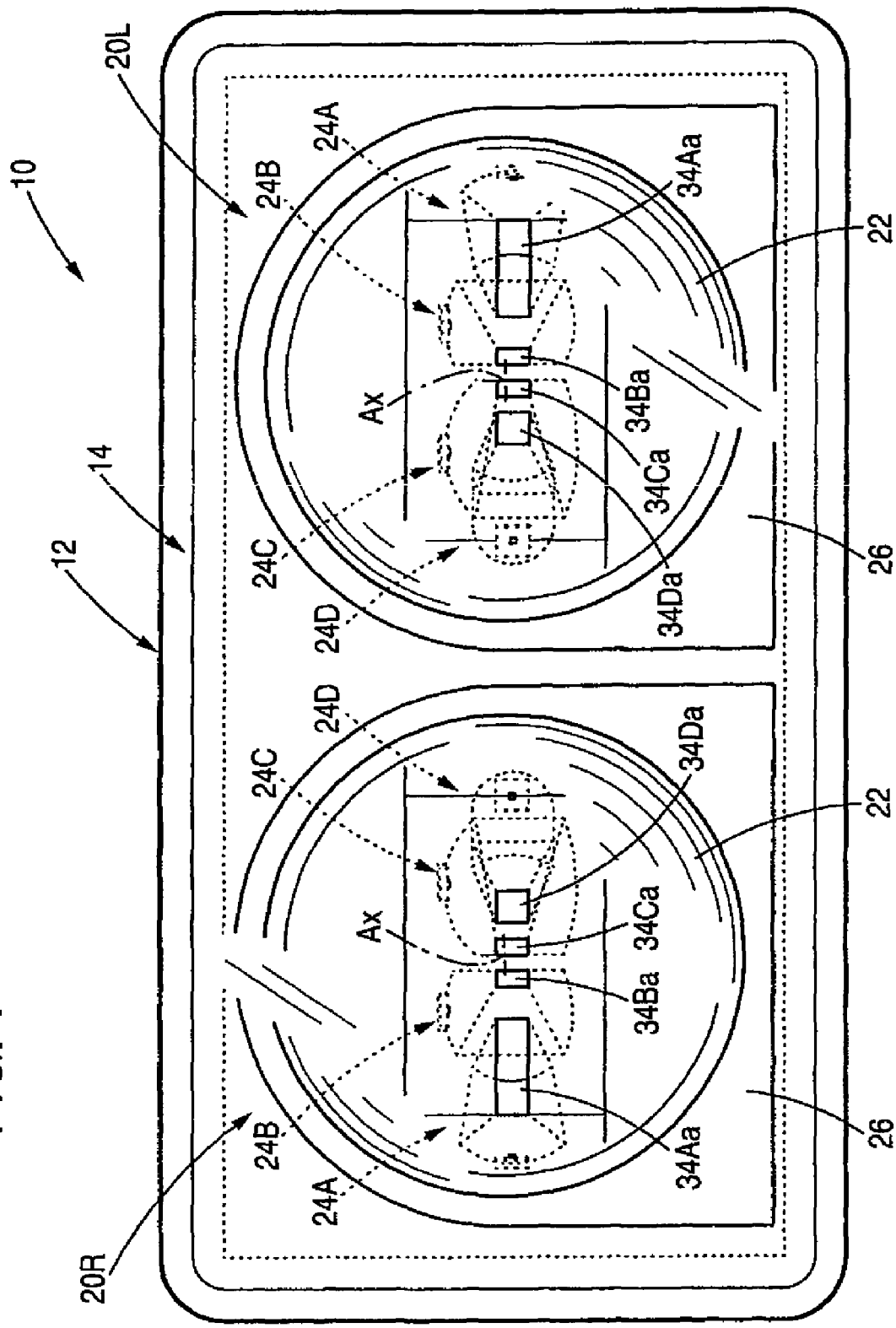
FIG. 1 is a front view showing a vehicle headlamp according to a first embodiment of the invention.

FIG. 1 is a front view showing a vehicle headlamp 10 according to a first embodiment of the invention.

As is shown in the same figure, a vehicle headlamp 10 according to this embodiment has a configuration in which two lamp units 20L, 20R are accommodated within a lamp compartment which is defined by a lamp body 12 and a clear or transparent light transmissive cover which is attached to a front opening portion of the lamp body 12.

Figure 5:
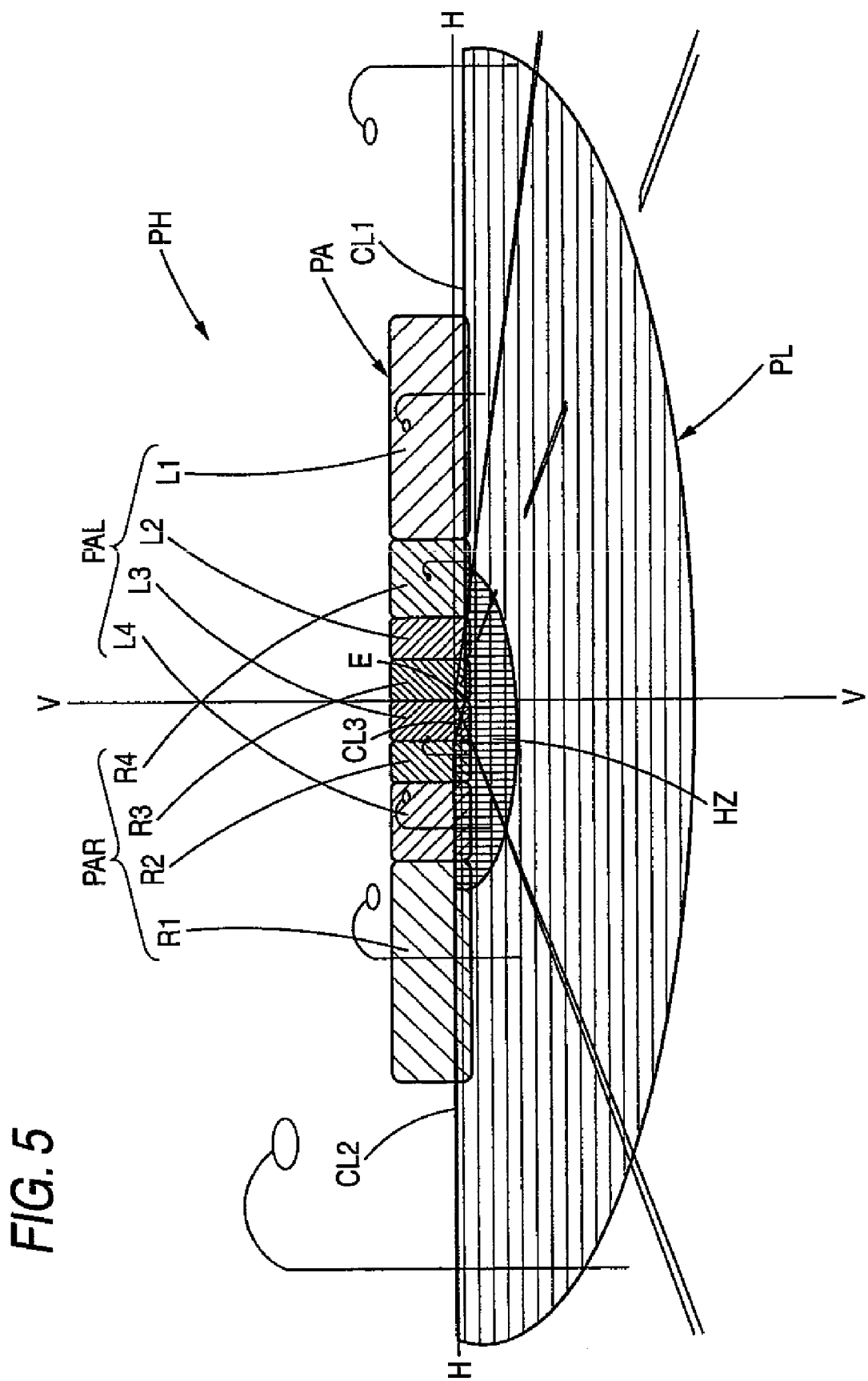
FIG. 5 is a perspective view showing an additional light distribution pattern formed on an imaginary vertical screen disposed in a position at a distance of 25 meters ahead of the vehicle by light emitted forwards from a pair of lamp units of the vehicle headlamp, together with a low-beam light distribution pattern formed by light emitted from other lamp units.

In this vehicle headlamp 10, an additional light distribution or light distribution pattern PA shown in FIG. 5 is formed by light emitted from the two lamp units 20L, 20R. This additional light distribution pattern PA is formed to be added to a normal low beam light distribution or light distribution pattern PL which is formed by light emitted from other lamp units (not shown).

A high beam light distribution or light distribution pattern PH is formed by adding the additional light distribution pattern PA to the low-beam light distribution pattern PL in the way described above, and by part of the additional light distribution pattern PA being formed in such a manner as to be selectively added to the low-beam light distribution pattern PL, a special low-beam light distribution pattern which increases the visibility of a road surface lying ahead of the vehicle is made to be formed, the details of which will be described later.

As is shown in FIG. 1, the two lamp units 20L, 20R are both a projector-type lamp unit and both have shapes which are symmetrical with each other. In addition, these lamp units are disposed in such a manner that directions of their axes Ax are aligned with each other (namely, in such a manner that their axes Ax extend parallel to each other). Thus, a specific configuration of the lamp unit 20R will be described.

Figure 2:
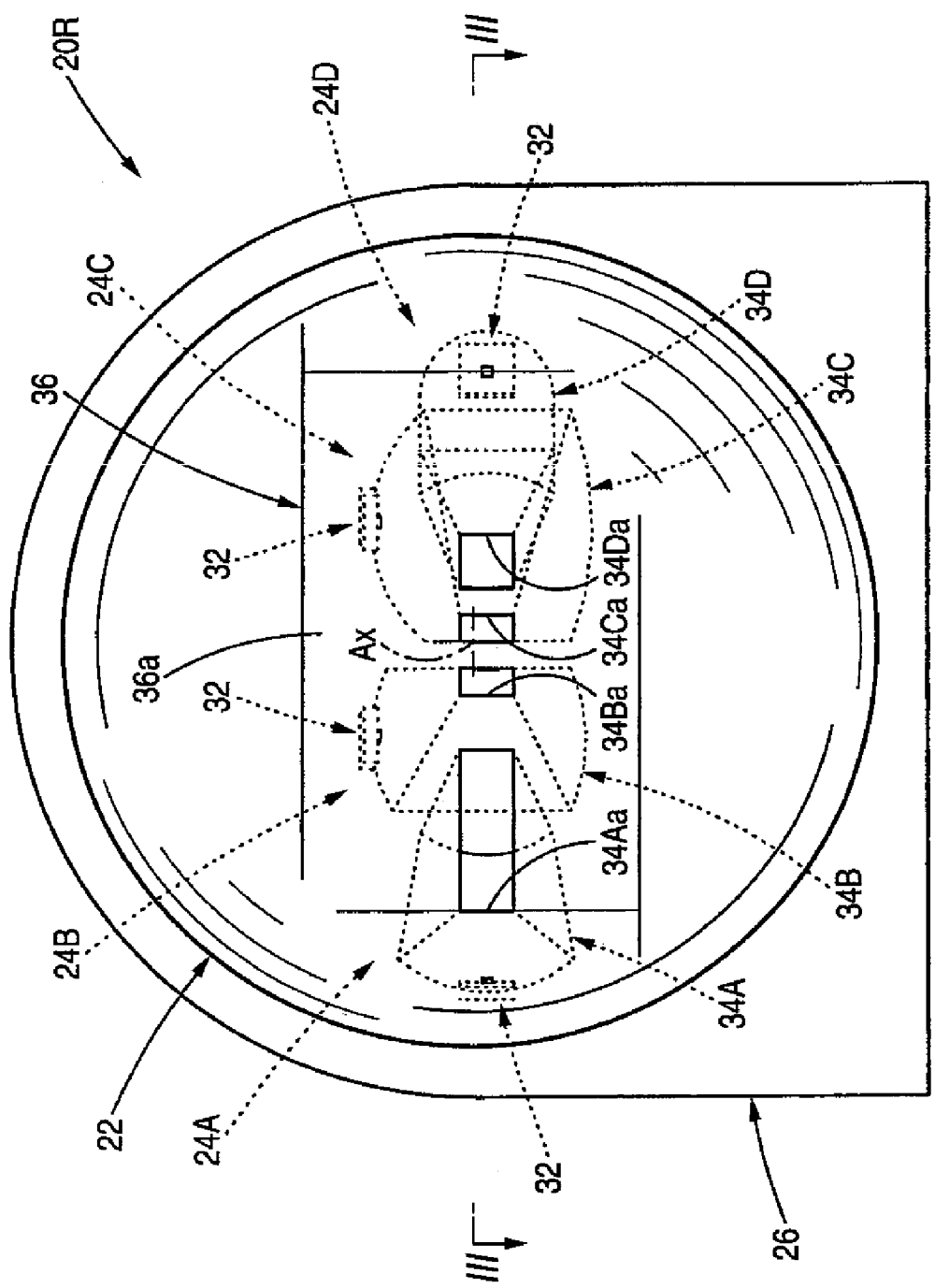
FIG. 2 is a front view showing singly one of lamp units of the vehicle headlamp.
Figure 3:
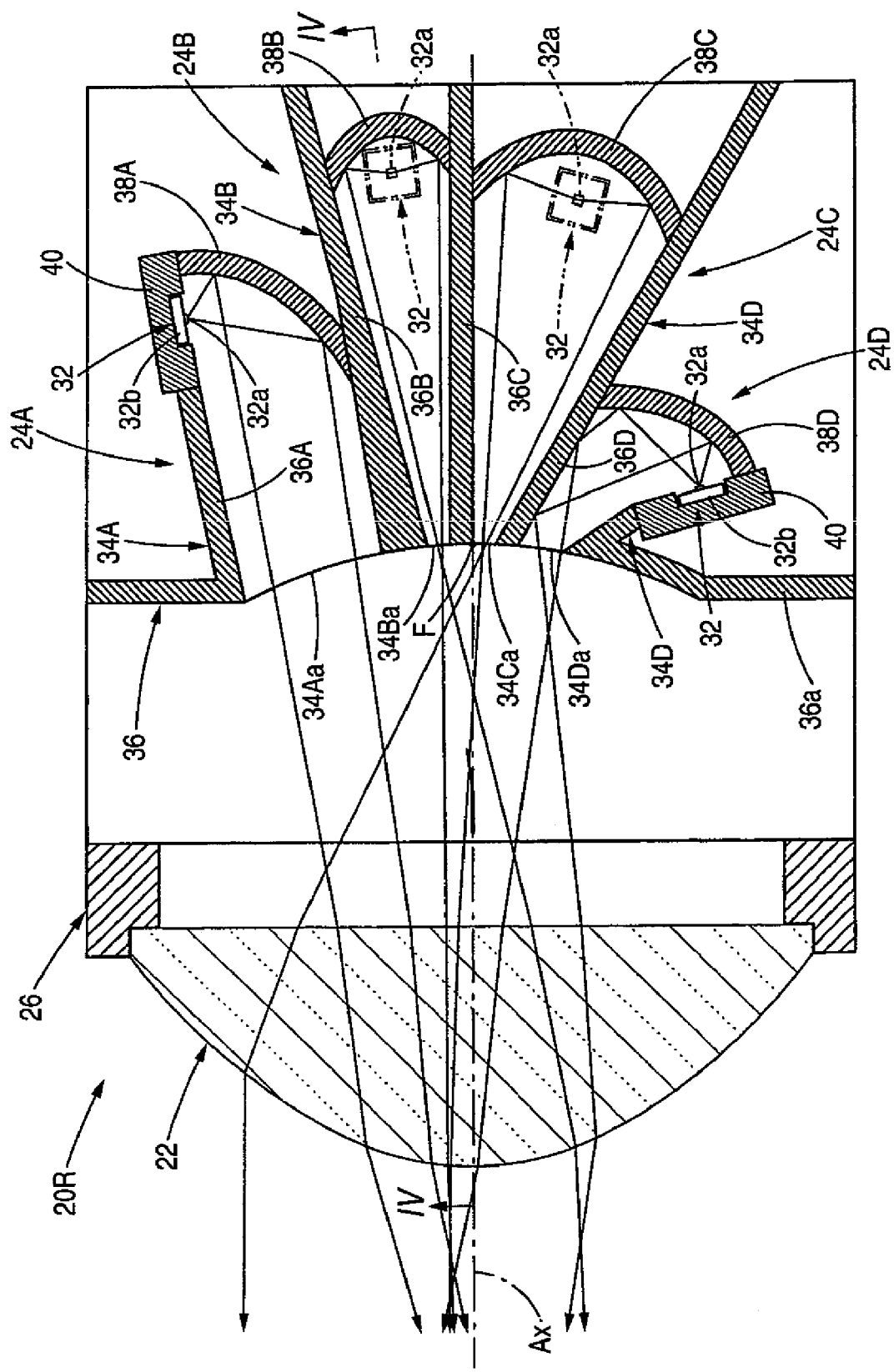
FIG. 3 is a sectional view taken along the line III-III in FIG. 2.
Figure 4:
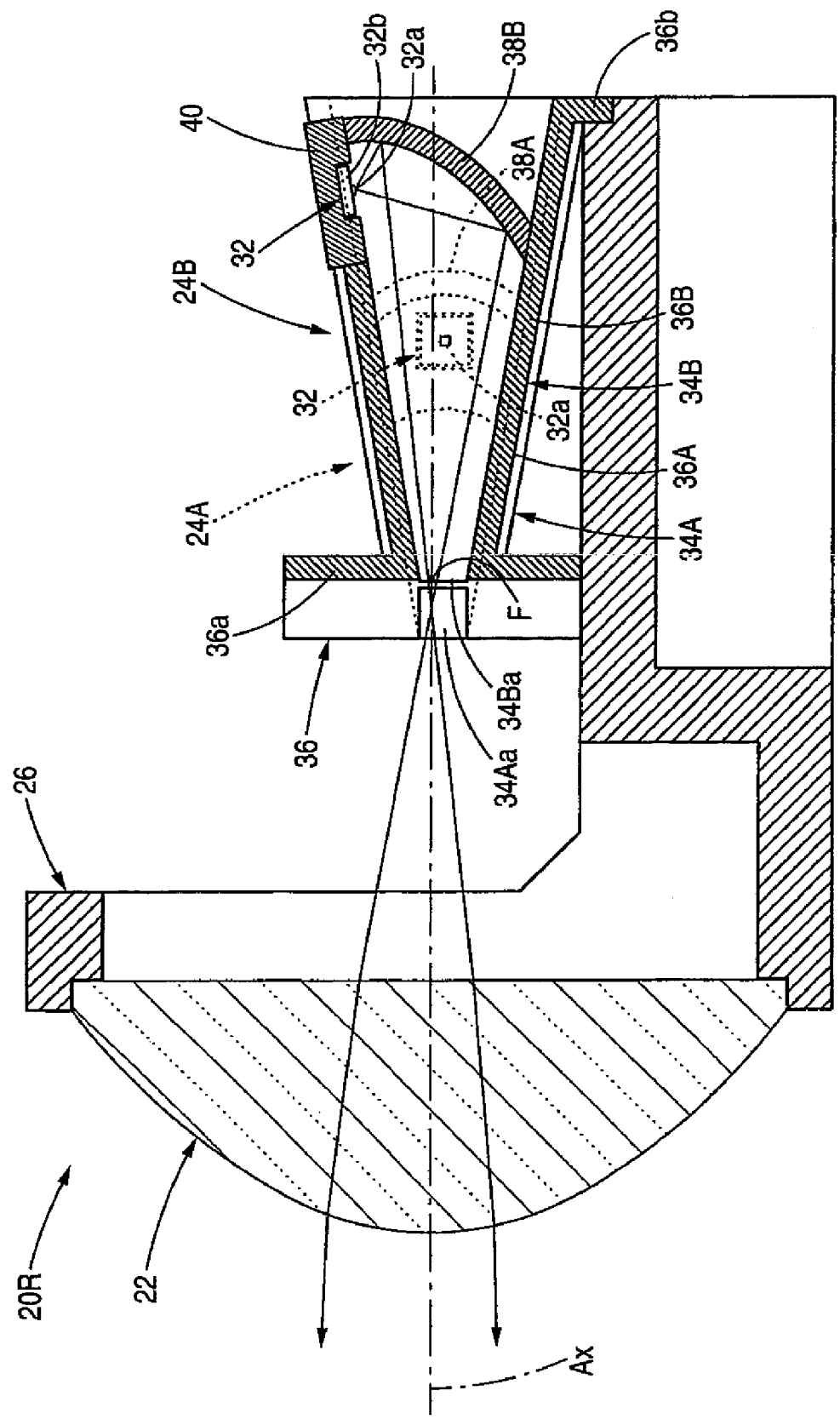
FIG. 4 is a sectional view taken along the line IV-IV in FIG. 3.

FIG. 2 is a front view showing the lamp unit 20R as a single unit. In addition, FIG. 3 is a sectional view taken along the line III-III in FIG. 2, and FIG. 4 is a sectional view taken along the line IV-IV in FIG. 3.

As is shown in these figures, the lamp unit 20R is configured to include a projection lens 22 which is disposed on an optical axis Ax which extends in a longitudinal direction of the vehicle, four light source units 24A, 24B, 24C, 24D which are disposed further rearwards than a rear focal plane which is a focal plane including a rear focal point F of the projection lens 22 and a holder 26 which fixedly supports the projection lens 22 and the four light source units 24A, 24B, 24C, 24D.

The projection lens 22 is made up of a planoconvex aspheric lens for which a front surface is convex and a rear surface is plane and is made to project a light source image formed on its rear focal plane on to an imaginary vertical screen disposed ahead of the lamp as an inverted image.

The four light source units 24A, 24B, 24C, 24D are made up of light emitting devices 32 and light guiding members 34A, 34B, 34C, 34D and are disposed in such a manner as to be arranged across the optical axis Ax horizontally. Due to this arrangement, the light source unit 24A is positioned at a right end portion (at a left end portion when the lamp unit is viewed from its front), the light source unit 24B is disposed adjacent to the left of the light source unit 24A, furthermore, the light source unit 24C is disposed adjacent to the left of the light source unit 24B, and the light source unit 24D is disposed adjacent to the left of the light source unit 24C. The optical axis Ax extends in such a manner as to pass near a right end portion of the light source unit 24C, which is situated in the third place from the right.

The light emitting devices 32 of the respective light source units 24A, 24B, 24C, 24D are all white light emitting diodes having the same configuration and are each made up of a light emitting chip 32a having a light emitting surface of a square of the order of 1 mm2 and a substrate 32b which supports the light emitting chip 32a. In this case, the light emitting chip 32a which constitutes a light source is sealed with a film which is formed in such a manner as to cover the light emitting surface.

These light emitting devices 32 are fixedly supported, respectively, on metallic support plates 40 on the substrates 32. Then, these support plates 40 are fixedly supported, respectively, on the light guiding members 34A, 34B, 34C, 34D.

The respective light guiding members 34A, 34B, 34C, 34D of the light source units 24A, 24B, 24C, 24D have rectangular front end light output ports 34Aa, 34Ba, 34Ca, 34Da. In addition, in these light source units 24A, 24B, 24C, 24D, light from the respective light emitting devices 32 is guided to the front end light output ports 34Aa, 34Ba, 34Ca, 34Da so as to let the light be emitted to the front from the front end light output ports 34Aa, 34Ba, 34Ca, 34Da.

The front end light output ports 34Aa, 34Ba, 34Ca, 34Da of the light guide members 34A, 34B, 34C, 34D of the light source units 24A, 24B, 24C, 24D are arranged on the rear focal plane of the projection lens 22 in such a manner as to be adjacent to each other in a horizontal direction. In these four front end light output ports 34Aa, 34Ba, 34Ca, 34Da, their vertical width is set to be 4 millimeters, but their horizontal widths are set to be given larger values as the front end light output ports 34Aa, 34Ba, 34Ca, 34Da are positioned further apart from the optical axis Ax.

Namely, in these four front end light output ports 34Aa, 34Ba, 34Ca, 34Da, the front end output port 34Ca, which is positioned in the third place from the right, is positioned closest to the optical axis Ax. The front end light output port 34Ba, which is positioned in the second place from the right, the front end light output port 34Da, which is positioned at the left end portion, and the front end light output port 34Aa, which is positioned at the right end portion, are disposed in such a manner as to spaced apart further in a bit-by-bit fashion from the optical axis Ax in that order. The horizontal widths of the front end light output port 34Ca, which is positioned closest to the optical axis Ax, and the front end light output port 34Ba, which is positioned second closest to the optical axis Ax, are set to be 2 millimeters, a horizontal width of the front end light output port 34Da, which is positioned slightly further from the optical axis Ax, is set to be 4 millimeters, and a horizontal width of the front end light output port 34Aa, which is positioned farthest from the optical axis Ax, is set to be, e.g., 12 millimeters.

The front end light output port 34Ca is formed in such a manner that a right-hand side surface thereof is positioned on a vertical plane which includes the optical axis Ax, the front end light output port 34Ba is formed in a position which is spaced apart 2 millimeters to the right from the front end light output port 34Ca, the front end light output port 34Da is formed in a position which is spaced apart 2 millimeters to the left from the front end light output port 34Ca, and the front end light output port 34Aa is formed in a position which is spaced apart 4 millimeters to the right from the front end light output port 34Ba. In addition, by this configuration, the horizontal widths of the front end light output ports 34Aa, 34Ba, 34Ca, 34Da and horizontal gaps between these front end light output ports 34Aa, 34Ba, 34Ca, 34Da are set to be put in a horizontally symmetrical positional relationship with respect to the vertical plane including the optical axis Ax.

In addition, the four front end light output ports 34Aa, 34Ba, 34Ca, 34Da are all formed in the positions which are slightly downwards relative to a horizontal plane which includes the optical axis Ax. Specifically, the respective front end light output ports 34Aa, 34Ba, 34Ca, 34Da are formed in such a manner as to be situated in the positions which are downwards on the order of 1 millimeters relative to the horizontal plane including the optical axis Ax at their vertical center positions.

The light guiding members 34A, 34B, 34C, 34D of the light source units 24A, 24B, 24C, 24D are formed in such a manner as to expand into a substantially conical shape as they extend from the front end light output ports 34Aa, 34Ba, 34Ca, 34Da to the rear and include tubular members 36A, 36B, 36C, 36D to inner circumferential surfaces of which a mirror finish treatment is applied and reflectors 38A, 38B, 38C, 38D which function as optical members which implement convergence controls for controlling light from the light emitting devices 32 to converge towards the front end light output ports 34Aa, 34Ba, 34Ca, 34Da.

The four tubular members 36A, 36B, 36C, 36D are formed integrally into a single block 36. In addition, by these tour tubular members 36A, 36B, 36C, 36D being formed integrally into the single block 36, the gaps between the front end light output ports 34Aa, 34Ba, 34Ca, 34Da are ensured to be made with good accuracy by a front wall 36a of the block 36. This block 36 is positioned and supported on the holder 26 at a lower end face of the front wall 36a and a positioning piece 36b formed at a rear end portion thereof.

In addition, the block 36 can be configured such that a portion which constitutes upper walls of the tubular members 36A, 36B, 36c, 36D are formed separately from a block main body portion which excludes the portion constituting the upper walls so that the upper wall constituting portion is attached to the block main body portion. By adopting this configuration, the moldability of the block 36 is increased, thereby making it possible to facilitate the manufacturing thereof.

The four reflectors 38A, 38B, 38C, 38D all have reflecting surfaces which are made up of curved surfaces close to paraboloidal planes.

The reflector 38A which is positioned at the right end portion is made to reflect light from the light emitting device 32 which is disposed to the right of the reflector in such a manner as to be oriented substantially to the left towards the front end light output port 34Aa as a convergent light which is close to parallel light. In addition, the reflector 38B which is positioned in the second place from the right is made to reflect light from the light emitting device 32 which is disposed above the reflector in such a manner as to be oriented substantially downwards towards the front end light output port 34Ba as convergent light which converges in the vicinity of the front end light output port 34Ba. Similarly, the reflector 38C which is positioned in the third place from the right is made to reflect light from the light emitting device 32 which is disposed above the reflector in such a manner as to be oriented substantially downwards towards the front end light output port 34Ca as convergent light which converges in the vicinity of the front end light output port 34Ca. Additionally, the reflector 38D which is disposed at the left end portion is made to reflect light from the light emitting device 32 which is disposed at the front of the reflector in such a manner as to be oriented substantially rearwards towards an inner surface of a side wall of the tubular member 36D which lies an optical axis Ax side thereof as convergent light so that the light is subjected to a regular reflection on the inner surface of the side wall to thereby converge slightly forwards of the front end light output port 34Da.

In the reflectors 38B, 38C, which are positioned in the second and third places from the right, the shapes of their reflecting surfaces are set so that light reflected thereon converges in the vicinity of upper end edges of the front end light output ports 34Ba, 34Ca. In addition, by this configuration, the flux density of reflected light which passes through the front end light output ports 34Ba, 34Ca is made to become relatively high in the vicinity of the upper end edges thereof.

In addition, because part of the reflected light from the reflectors 38B, 38C is regular reflected at a reflection angle close to 90° on inner surfaces of the upper walls of the tubular members 36B, 36C, the flux density of reflected light which passes in the vicinity of the upper end edges of the front end light output ports 384Ba, 34Ca is increased further.

On the other hand, the shapes of reflecting surfaces of the reflector 38A, which is positioned at the right end portion, and the reflector 38D, which is positioned at the left end portion, are set such that the flux density of reflected light which passes through the front end light output ports 34Aa, 34Da becomes substantially uniform.

FIG. 5 is a perspective view showing the additional light distribution pattern PA which is formed on the imaginary vertical screen disposed in a position at a distance of 25 m ahead of the vehicle by light emitted forwards from the lamp units 20L, 20R according to the embodiment, together with the low-beam light distribution pattern PL which is formed by light emitted from other lamp units.

Before the description of the additional light distribution pattern PA, the low-beam light distribution pattern PL will be described.

As is shown in FIG. 5, this low-beam light distribution pattern PL is a light distribution pattern for the left-hand side traffic and has a horizontally stepped cut-off made up of CL1, CL2 and CL3.

This cut-off line CL1, CL2, CL3 extends horizontally while being stepped horizontally at a line V-V, as a boundary, which is a vertical line passing through an H-V point which is a vanishing point in the front direction of the lamp. The cut-off line is formed in such a manner that a right-hand side portion from the line V-V extends horizontally as an oncoming vehicle lane side cut-off line CL, while a left-hand side portion from the line V-V extends horizontally as a subject vehicle lane side cut-off line CL2 which is stepped upwards from the oncoming vehicle lane side cut-off line CL1. In addition, an end portion of the subject vehicle lane side cut-off line CL2 which lies closer to the lie V-V is formed as an oblique cut-off line. This oblique cut-off line CL3 extends obliquely leftwards upwards at an angle of 15° from a point of intersection between the oncoming vehicle lane side cut-off line CL1 and the line V-V.

In this low-beam light distribution pattern PL, an elbow point E which is the point of intersection between the oncoming vehicle lane side cut-off line CL1 and the line V-V is positioned 0.5 to 0.6° below the H-V point, and a hot zone HZ which is a high luminous intensity area is formed in such a manner as to surround the elbow point E in a slightly leftward portion thereof.

The additional light distribution pattern PA is made to be formed as a composite light distribution pattern of a unit light distribution pattern PAL which is formed by light emitted from the lamp unit 20L and a unit light distribution pattern PAR which is formed by light emitted from the lamp unit 20R.

As has been described above, these two unit light distribution patterns PAL, PAR are formed in a horizontally symmetrical positional relationship with respect to the line V-V because the two lamp units 20L, 20R have the horizontally symmetrical shapes with each other and are disposed in such a manner that the directions of the axes Ax thereof are aligned with each other. Then, firstly, the unit light distribution pattern PAR will be described.

The light distribution pattern PAR of this lamp unit is formed as a collection of four light distribution patterns R1, R2, R3, R4 which are formed in parallel in the horizontal direction by light from the four light source units 24A, 24B, 24C, 24D.

These four light distribution patterns R1, R2, R3, R3 are all formed into a substantially rectangular shape and discretely in the horizontal direction as inverted projected images of the four front end light output ports 34Aa, 34Ba, 34Ca, 34Da which are disposed discretely in the horizontal direction on the rear focal plane of the projection lens 22. As this occurs, on the imaginary vertical screen, an image having a size of 1 square millimeter on the rear focal plane of the projection lens 22 is formed as an image having a size of the order of 1 square degree.

Because the vertical center positions of the respective front end light output ports 34A, 34Ba, 34Ca, 34Da are situated on the order of 1 millimeter downwards relative to the horizontal plane including the optical axis Ax, the respective light distribution patterns R1, R2, R3, R4 formed in such a manner that their vertical center positions are situated 10 upwards relative to a line H-H which is a horizontal line passing the H-V point.

On the other hand, the respective light distribution patterns R1, R2, R3, R4 are formed in the horizontal direction as will be described below.

Namely, because the front end light output port 34Ca has the rectangular shape having the vertical width of 4 millimeters and the horizontal width of 2 millimeters and is formed in such a manner that its right-hand side surface is positioned on the vertical plane which includes the optical axis Ax, the light distribution pattern R3 as the inverted projected image of the front end light output port 34Ca is formed into a substantially rectangular shape having a vertical width of the order of 4° and a horizontal width of the order of 2° with its left-hand side surface positioned on the line V-V.

Because the front end light output port 34Ba has the rectangular shape having the vertical width of 4 millimeters and the horizontal width of 2 millimeters and is formed in the position spaced apart 2 millimeters to the right from the front end light output port 34Ca, the light distribution pattern R2 as the inverted projected image of the front end light output port 34Ba is formed into a substantially rectangular shape having a vertical width of the order of 4° and a horizontal width of the order of 2° while being positioned to the left of the light distribution pattern R3 at an interval equal to the horizontal width of the light distribution pattern R3 (that is, an interval of the order of 2°).

Because the front end light output port 34Da has the rectangular shape having the vertical width of 4 millimeters and the horizontal width of 4 millimeters and is formed in the position spaced apart 2 millimeters to the left from the front end light output port 34Ca, the light distribution pattern R4 as the inverted projected image of the front end light output port 34Da is formed into a substantially rectangular shape having a vertical width of the order of 4° and a horizontal width of the order of 4° while being positioned to the right of the light distribution pattern R3 at an interval equal to the horizontal width of the light distribution pattern R3 (and the horizontal width of the light distribution pattern R3) (that is, an interval of the order of 2°).

Because the front end light output port 34Aa has the rectangular shape having the vertical width of 4 millimeters and the horizontal width of 12 millimeters and is formed in the position spaced apart 4 millimeters to the right from the front end light output port 34Ba, the light distribution pattern R1 as the inverted projected image of the front end light output port 34Aa is formed into a substantially rectangular shape having a vertical width of the order of 4° and a horizontal width of the order of 12° while being positioned to the left of the light distribution pattern R2 at an interval equal to the horizontal width of the light distribution pattern R4 (that is, an interval of the order of 4°).

In the light source units 24B, 24C, which are positioned in the second place and third place from the right, because the flux density of reflected light which passes through the front end light output ports 34Ba, 34Ca thereof is set to become relatively high in the vicinity of their upper end edges, the light distribution patterns R2, R3 which are the inverted projected images of the front end light output ports 34Ba, 34Ca are formed as light distribution patterns having high luminous intensities in the vicinity of their lower end edges.

In contrast to this, in the light source unit 24A, which is positioned at the right end portion, and the light source unit 24D, which is positioned at the left end portion, because the flux density of reflected light which passes through the front end light output ports 34Aa, 34Da thereof is set to become substantially uniform, the light distribution patterns R1, R4 which are the inverted projected images of the front end light output ports 34Aa, 34Da are formed as light distribution patterns having substantially uniform luminous intensity distributions.

As has been described above, the other unit light distribution pattern PAL is formed horizontally symmetrical with the unit light distribution pattern PAR with respect to the line V-V.

Namely, while the unit light distribution pattern PAL is formed as a collection of four light distribution patterns L1, L2, L3, L4 which are formed in parallel in the horizontal direction by light from the four light sources 24A, 24B, 24C, 24D of the lamp unit 20L, as this occurs, the respective light distribution patterns L1, L2, L3, 4 are formed in a horizontally symmetrical positional relationship with the respective light distribution patterns R1, R2, R3, R4 of the unit light distribution pattern PAR with respect to the line V-V.

As a result, the respective light distribution patterns L1, L2, L3, L4 which make up the unit light distribution pattern PAL are accurately fitted in gaps between the respective light distribution patterns R1, R2, R3, R4 which make up the unit light distribution pattern PAR, respectively, whereby the additional light distribution pattern PA is formed as a continuous horizontally elongated light distribution pattern having no dark portion.

Because a vertical center position of this additional light distribution pattern PA is positioned on the order of 1° upwards relative to the line H-H, a lower end edge thereof is positioned on the order of 1° upwards to approach the line H-H, whereby the additional light distribution pattern PA comes to be formed in such a manner as to slightly overlap the oncoming vehicle lane side cut-off line CL1 of the low-beam light distribution pattern PL.

In addition, because the light distribution patterns L2, R2, L3, R3 which are positioned in the vicinity of the line V-V are formed as the light distribution patterns having the high luminous intensities in the vicinity of the lower end edges thereof, an area lying in the vicinity of the H-V point becomes particularly bright.

Consequently, the high-beam light distribution pattern PH which is formed as the composite light distribution pattern of the additional light distribution pattern PA and the low-beam light distribution pattern PL becomes a light distribution pattern which has the hot zone in the vicinity of the H-V point and the superior visibility of a distant area on the road surface.

In this embodiment, although the high-beam light distribution pattern PH is made to be formed by the additional light distribution pattern PA being formed additionally to the low-beam light distribution pattern PL in such a state that the eight light distribution patterns L1, L2, L3, L4, R1, R2, R3, R4 which make up the additional light distribution pattern PA are all formed, in addition to this, a special low-beam light distribution pattern which has an increased visibility of the road surface ahead of the vehicle is made to be formed by selectively forming part of the additional light distribution pattern PA for addition to the low-beam light distribution pattern PL (in other words, by not forming part of the additional light distribution pattern PA).

Hereinafter, the details of the light source unit illuminating/turning off control carried out in forming this special low-beam light distribution pattern will be described.

Figure 6:
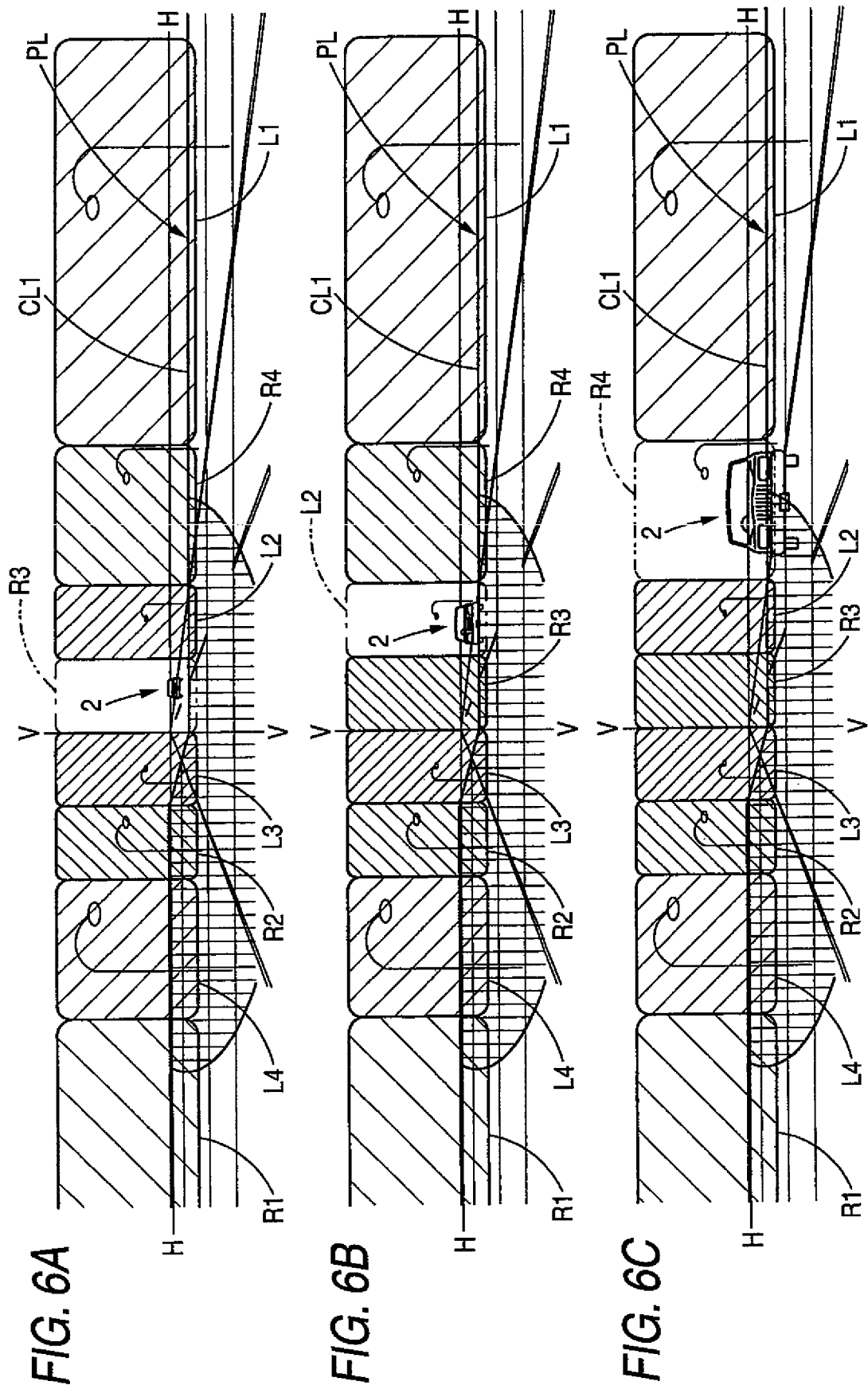
FIGS. 6A, 6B, and 6C are enlarged views showing part of FIG. 5 for the purpose of explaining the details of a light source unit illuminating/turning off control in the first embodiment.

FIGS. 6A, 6B, and 6C show enlarged views showing part of FIG. 5 for the purpose of explaining the details of this light source illuminating/turning off control.

As is shown in FIG. 6A, when there is present an oncoming vehicle 2, which is running on an oncoming vehicle lane on the road surface ahead of the subject vehicle, this oncoming vehicle 2 running still distant from the subject vehicle, by turning off only the light source unit 24C of the lamp unit 20R, in the eight light distribution patterns L1, L2, L3, L4, R1, R2, R3, R4 which make up the additional light distribution pattern PA, only the light distribution pattern R3 that is to be formed in the position where the oncoming vehicle 2 is present is made not to be formed.

Thereafter, as is shown in FIG. 6B, when the oncoming vehicle 2 is approaching the subject vehicle to some extent, by turning off the light source unit 24B of the lamp unit 20L and illuminating the light source unit 24C of the lamp unit 20R, in the eight light distribution patterns L1, L2, L3, L4, R1, R2, R3, R4 which make up the additional light distribution pattern PA, only the light distribution pattern L2 that is to be formed in the position where the oncoming vehicle 2 is present is made not to be formed.

Thereafter, as is shown in FIG. 6C, when the oncoming vehicle 2 is approaching the subject vehicle further, by turning off the light source unit 24D of the lamp unit 20R and illuminating the light source unit 24B of the lamp unit 20L, in the eight light distribution patterns L1, L2, L3, L4, R1, R2, R3, R4 which make up the additional light distribution pattern PA, only the light distribution pattern R4 that is to be formed in the position where the oncoming vehicle 2 is present is made not to be formed.

Thereafter, when the oncoming vehicle 2 is approaching the subject vehicle nearer than what is shown in FIG. 6C, by turning off the light source unit 24A of the lamp unit 20L and illuminating the light source unit 24D of the lamp unit 20R, in the eight light distribution patterns L1, L2, L3, L4, R1, R2, R3, R4 which make up the additional light distribution pattern PA, only the light distribution pattern L1 that is to be formed in the position where the oncoming vehicle 2 is present is made not to be formed.

In this way, by the respective light source units of the lamp units 20L, 20R being controlled to be illuminated or turned off so that only the light distribution pattern that is to be formed in the position where the oncoming vehicle 2 is present is made not to be formed sequentially, the visibility of the road surface lying ahead of the vehicle is increased sufficiently without dazzling the driver of the oncoming vehicle.

In addition, a horizontal position of the oncoming vehicle 2, which is running on the oncoming vehicle lane on the road surface ahead of the subject vehicle on the imaginary vertical screen, can easily be detected, for example, by photographing or sensing as an image a landscape ahead of the subject vehicle by CCD cameras or the like and detecting the positions of the headlamps, which are in an illuminated state, of the oncoming vehicle 2 as high-density pixels based on the photographed or sensed data.

Thus, as has been described in detail, in the vehicle headlamp 10 according to the embodiment, the lamp units 20L, 20R thereof each include the projection lens 22 and the four light source units 24A, 24B, 24C, 24D, which are disposed further rearwards than the rear focal plane of the projection lens 22, and in this configuration, and the respective light source units 24A, 24B, 24C, 24D include the light emitting devices 32 and the light guiding members 34A, 34B, 34C, 34D which have the rectangular front end light outlet ports 34Aa, 34Ba, 34Ca, 34Da and which are adapted to guide light from the light emitting devices 32 to the front end light outlet ports 34Aa, 34Ba, 34Ca, 34Da so that the light so guided is allowed to be emitted forwards. In addition, the respective light source units 24A, 24B, 24C, 24D are disposed in such a manner that the front end light outlet ports 34Aa, 34Ba, 34Ca, 34Da of the light guiding members 34A, 34B, 34C, 34D are arranged to be adjacent to each other in the horizontal direction on the rear focal plane of the projection lens 22. Thus, according to this configuration, the following functions and advantages can be obtained.

Namely, while emanating light from the respective light source units 24A, 24B, 24C, 24D is made up of the light from the light emitting devices which is guided to the front end light output ports 34Aa, 34Ba, 34Ca, 34Da of the light guiding members 34A, 34B, 34C, 34D, the light from the light emitting devices 32 is made to have a uniform light distribution or to have a specific light distribution by the optical action of the light guiding members 34A, 34B, 34C, 34D. In addition, because the front end light output ports 34Aa, 34Ba, 34Ca, 34Da of the respective light source units 24A, 24B, 24C, 24D are positioned on the rear focal plane of the projection lens, the light source images formed on the rear focal plane of the projection lens 22 by the light from the light emitting devices 32 become images having substantially uniform brightness or images having a specific luminous intensity distribution. Consequently, the respective light distribution patterns R1, R2, R3, R4 which are formed as the inverted projected images of the respective light source images on the rear focal plane also constitute the light distribution patterns having substantially uniform brightness or light distribution patterns having a specific luminous intensity distribution.

Because the respective light source images formed on the rear focal plane have substantially the same contour as that of the opening shapes of the front end light output ports 34Aa, 34Ba, 34Ca, 34Da of the light guiding member 34A, 34B, 34C, 34D of the respective light source units 24A, 24B, 24C, 24D, the light distribution patterns R1, R2, R3, R4 that are formed as the inverted projected images thereof also constitute the light distribution patterns having a clear contour.

In this way, according to the embodiment, the light distribution patterns R1, R2, R3, R4 formed by light from the four light source units 24A, 24B, 24C, 24D can be made the light distribution patterns having clear contours, as well as substantially uniform brightness or specific luminous intensity distributions.

Moreover, because the lamp unit 20R includes, as the light guiding members 34A, 34B, 34C, 34D of the light source units 24A, 24B, 24C, 24D, the tubular members 36A, 36B, 36C, 36D which are formed in such a manner as to expand in the substantially conical shape from the front end light output ports 34Aa, 34Ba, 34Ca, 34Da towards the rear and to the inner circumferential surfaces of which a mirror finish treatment is applied and the reflectors 38A, 38B, 38C, 38D, as optical members, which are disposed in the vicinity of rear end portions of the tubular members 36A, 36B, 36C, 36D for controlling the convergence of light from the light emitting devices 32 towards the front end light output ports 34Aa, 34Ba, 34Ca, 34Da, the following functions and advantages can be obtained.

Namely, in the respective light source units 24A, 24B, 24C, 24D, the light from the light emitting devices 32 can be guided to the front end light output ports 34Aa, 34Ba, 34Ca, 34Da with good efficiency by the convergence control by the reflectors 38A, 38B, 38C, 38D and reflection control on the inner circumferential surfaces of the tubular members 36A, 36B, 36C, 36D, and the emanating light from the front end light output ports 34Aa, 34Ba, 34Ca, 34Da can be made to be incident on the projection lens 22 with good efficiency, thereby making it possible to make effective use of the luminous flux of the light sources.

In addition, the luminous intensity distribution of the light source images formed at the front end light output ports 34Aa, 34Ba, 34Ca, 34Da can be controlled in detail by adjusting suitably the degree of convergence of light from the light emitting devices 32 by the reflectors 38A, 38B, 38C, 38D, whereby the luminous intensity distribution of the light distribution patterns R1, R2, R3, R4 can also be controlled in detail.

Namely, in the light source units 24B, 24C, which are positioned in the second place and third place from the right, because the flux density of reflected light which passes through the front end light output ports 34Ba, 34Ca thereof is set to become relatively high in the vicinity of their upper end edges, the light distribution patterns R2, R3 which are the inverted projected images of the front end light output ports 34Ba, 34Ca can be formed as the light distribution patterns having high luminous intensities in the vicinity of their lower end edges. On the other hand, in the light source unit 24A, which is positioned at the right end portion, and the light source unit 24D, which is positioned at the left end portion, because the flux density of reflected light which passes through the front end light output ports 34Aa, 34Da thereof is set to become substantially uniform, the light distribution patterns R1, R4 which are the inverted projected images of the front end light output ports 34Aa, 34Da can be formed as the light distribution patterns having substantially uniform luminous intensity distributions.

In addition, in the vehicle headlamp 10 according to the embodiment, the two lamp units 20L, 20R, which constitute the vehicle headlamp 10, have the horizontally symmetrical shapes with each other and are disposed in such a manner that the directions of the optical axes thereof are aligned with each other, the unit light distribution patterns PAL, PAR which are formed by the light illuminated from the respective lamp units 20L, 20R are formed in the horizontally symmetrical positional relationship with respect to the line V-V. Because the four light distribution patterns L1, L2, L3, L4 which make up the unit light distribution pattern PAL and the four light distribution patterns R1, R2, R3, R4 which make up the unit light distribution pattern PAR are formed in such a manner that the light distribution patterns L1, L2, L3, L4 fit accurately in the gaps formed between the gaps between the respective light distribution patterns R1, R2, R3, R4, the additional light distribution pattern PA can be formed as the continuous horizontally elongated light distribution pattern with no dark portion.

Moreover, because the light distribution patterns L2, R2, L3, R3 which are positioned in the vicinity of the line V-V are formed as the light distribution patterns having the high luminous intensities in the vicinity of the lower end edges thereof, the area lying in the vicinity of the H-V point becomes particularly bright. Consequently, the high-beam light distribution pattern PH, which is formed as the composite light distribution pattern of the additional light distribution pattern PA and the low-beam light distribution pattern PL, becomes the light distribution pattern having the hot zone in the vicinity of the H-V point and the superior visibility of the distant area on the road surface.

Furthermore, in the embodiment, because the special low-beam light distribution pattern is made to be formed by implementing the light source unit illuminating/turning off control in which in the eight light distribution patterns L1, L2, L3, L4, R1, R2, R3, R4 which make up the additional light distribution pattern PA, only the light distribution pattern that is to be formed in the position where the oncoming vehicle 2 is present is made not to be formed sequentially, the visibility of the road surface ahead of the vehicle can be enhanced without dazzling the driver of the oncoming vehicle.

In the respective lamp units 20L, 20R, because the horizontal widths of the front end light outlet ports 34Aa, 34Ba, 34Ca, 34Da of the light guiding members 34A, 34B, 34C, 34D are set to be given larger values such as 2 millimeters, 2 millimeters, 4 millimeters and 12 millimeters as they are positioned further apart from the optical axis Ax, the following functions and advantages can be obtained.

Namely, on the imaginary vertical screen disposed ahead of the vehicle, the oncoming vehicle which runs based on the left-hand side traffic is displaced or changes its position from the front direction of the lamp to the right as it is approaching the subject vehicle, and the degree to which the position of the oncoming vehicle is changed increases gradually as it is approaching the subject vehicle.

Then, in the event that the horizontal widths of the front end light outlet ports 34Aa, 34Ba, 34Ca, 34Da which are formed in the substantially rectangular shapes are set to be given larger values as they are positioned further apart from the optical axis Ax, the light distribution pattern that is to be formed in the position where the oncoming vehicle is present can be made not to be formed sequentially by the respective light source units 24A, 24B, 24C, 24D being illuminated or turned off at equal time intervals or time intervals approximate thereto.

Moreover, by adopting the configuration described above, the light distribution patterns R3, L3 which illuminate the distant-range area on the road surface ahead of the vehicle can be made the light distribution patterns which have the small horizontal widths and which are very bright, the light distribution patterns R4, L4 which illuminate the middle-range area on the road surface ahead of the vehicle can be made the light distribution patterns which have the slightly large horizontal widths and which are bright to some extent, and the light distribution patterns R1, L1 which illuminate the near-range area on the road surface ahead of the vehicle can be made the light distribution patterns which have the large horizontal width and which are slightly bright, whereby the road surface ahead of the vehicle can be illuminated with proper brightness, thereby making it possible to enhance the visibility of the road surface further.

In addition, in the first embodiment, while the light emitting chip 32a of the light emitting device 32 has been described as having the square light emitting surface of the order of 1°×1 millimeter, there can of course be adopted a configuration in which the light emitting chip 32a has other shapes and sizes than that described above.

In addition, in the first embodiment, while the front end light outlet ports 34Aa, 34Ba, 34Ca, 34Da of the light guiding members 34A, 34B, 34C, 34D of the respective light source units 24A, 24B, 24C, 24D are described as being disposed on the rear focal plane of the projection lens, even when the front end light outlet ports 34Aa, 34Ba, 34Ca, 34Da are disposed on a focal plane which includes a rear focal point F of the projection lens 22 with a view to simplifying the configurations of the respective lamp units 20L, 20R, substantially the same functions and advantages as those of the first embodiment can be obtained.

Namely, when the configuration described above is adopted, the contours of the respective light source images formed on the rear focal plane of the projection lens 22 become slightly different from the contours of the front end light output ports 34Aa, 34Ba, 34Ca, 34Da, and in the light distribution patterns which are formed as the inverted projected images of the front end light output ports 34Aa, 34Ba, 34Ca, 34Da, although the light distribution patterns L1, R1 which are formed in the positions lying far apart from the line V-V become unclear more or less, the light distribution patterns L4, R4 which are formed in the positions lying not so far apart from the line V-V become slightly unclear, and the light distribution patterns L2, R2, L3, R3 which are positioned in the vicinity of the line V-V become substantially clear. Consequently, the contours of the light distribution patterns R3, L3 and light distribution patterns R2, L2 which illuminate the distant-range area on the road surface ahead of the vehicle become substantially clear, and the contours of the light distribution patterns R4, L4 which illuminate the middle-range area on the road surface ahead of the vehicle also become slightly unclear. Moreover, the contours of the light distribution patterns R1, L1 which illuminate the near-range area on the road surface ahead of the vehicle only become unclear more or less. Practically, no problem will be caused.

Furthermore, in the first embodiment, while the lamp units 20L, 20R have been described as each having the four light source units 24A, 24B, 24C, 24D, as long as a plurality of light source units are provided, even in the event that the number of light source units is set to any other numbers than the number above, by adopting a similar configuration to that of the first embodiment, the same functions and advantages as those of the first embodiment can be obtained.

Figure 7:
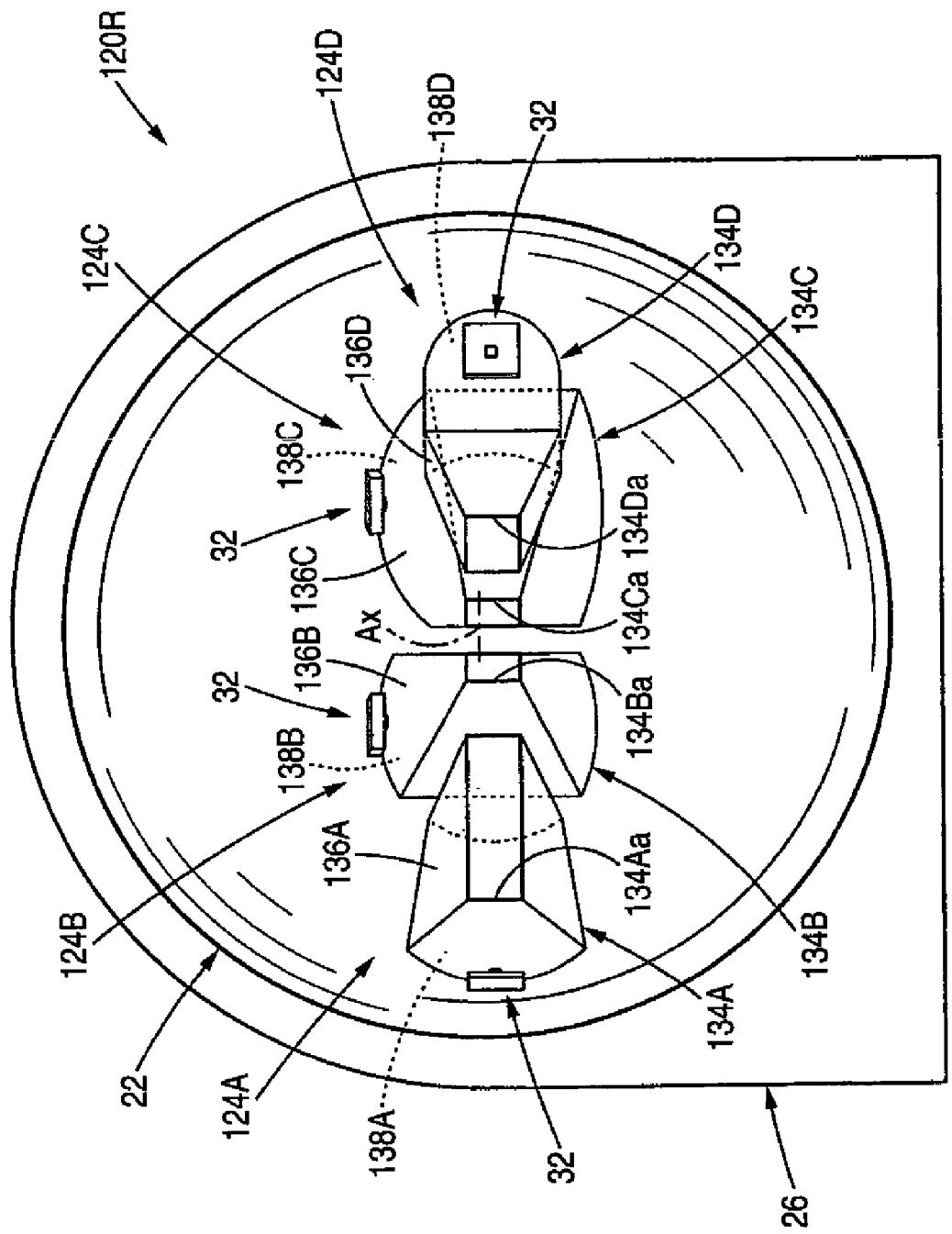
FIG. 7 is a diagram similar to FIG. 2, which shows a lamp unit according to an embodiment having an exemplary modification made to the one lamp unit shown above.

FIG. 7 is a diagram similar to FIG. 2, which shows a lamp unit 120R according an embodiment having an exemplary modification to the lamp unit 20R described above.

As is shown in FIG. 7, a basic configuration of a lamp unit 120R according to the embodiment with the exemplary modification is similar to that of the lamp unit 20R that has been described above. However, configurations of light guiding members 134A, 134B, 134C, 134D of four light source units 124A, 124B, 124C, 124D are different from those of the embodiment described above.

Namely, the light guiding members 134A, 134B, 134C, 134D of the modified embodiment include, respectively, light transmissive members 136A, 136GB, 136C, 136D which are formed in such a manner as to expand into substantially conical shapes from front end light output ports 134Aa, 134Ba, 134Ca, 134Da to the rear and reflectors 138A, 138B, 138C, 138D which are optical members for controlling light from light emitting devices 32 to converge towards the front end light output ports 134Aa, 134Ba, 134Ca, 134Da.

These light guiding members 134A, 134B, 134C, 134D are formed of color less transparent resin blocks. In addition, outer circumferential surfaces of the light guiding members 134A, 134B, 134C, 134D are set, respectively, to the same shapes as those of the inner circumferential surfaces of the tubular members 36A, 36B, 36C, 36D of the embodiment described above. In addition, reflecting surfaces of the reflectors 138A, 138B, 138C, 138D are formed by applying a mirror finish treatment to surfaces of the resin block, and shapes of the reflecting surfaces are set to the same shapes as the shapes of the reflecting surface of the reflectors 38A, 38B, 38C, 38D of the embodiment described above.

In this lamp unit 120R, as with the embodiment described above, the light from the light emitting devices 32 of the respective light source units 124A, 124B, 124C, 124D can be guided to the front end light output ports 134Aa, 134Ba, 134Ca, 134Da with good efficiency by convergent reflection controls by the reflectors 138A, 138B, 138C, 138D and inner surface reflection controls by total reflection on the outer circumferential surfaces of the light transmissive members 136A, 136B, 136C, 136D, and emanating light from the front end light output ports 134Aa, 134Ba, 134Ca, 134Da can be made to be incident on the a projection lens 22 with good efficiency, thereby making it possible to make effective use of the luminous flux of the light sources.

In particular, output angles of emanating light from the light transmissive members 136A, 136B, 136C, 136D become large due to retracting actions at the front end light output ports 134Aa, 134Ba, 134Ca, 134Da and the light emanating therefrom becomes difficult to be incident on the projection lens 22. Therefore, it becomes extremely effective to form the light transmissive members 136A, 136B, 136C, 136D in such a manner as to expand into the substantially conical shape from the front end light output ports 134Aa, 134Ba, 134Ca, 134Da to the rear.

Note that a lamp unit having a shape which is horizontally symmetrical with the lamp unit 120R according to the modified embodiment may, of course, be used in place of the lamp unit 20L according to the embodiment described above.

When the respective light guiding members 134A, 134B, 134C, 134D are formed of the resin blocks in the way described above, it is also possible to arrange the front end light output ports 134Aa, 134Ba, 134Ca, 134Da in such a manner that they are brought into close contact with each other.

In the lamp unit 120R, in the event that the two light guiding members 134A, 134B which are disposed to the right of the optical axis Ax are moved to the left of the optical axis Ax so that the front end light output port 134Ba of the light guiding member 134B is disposed between the front end light output port 134Ca and the front end light output port 134Da and the front end light output port 134Aa of the light guiding member 134A is disposed next to the left of the front end light output port 134Da, the four light distribution patterns R3, L2, R4, L1 which are formed on the right-hand side of the line V-V in the additional light distribution pattern PA shown in FIG. 5 can be formed by the lamp unit 120R singly.

Next, a second embodiment of the invention will be described below.

Figure 8:
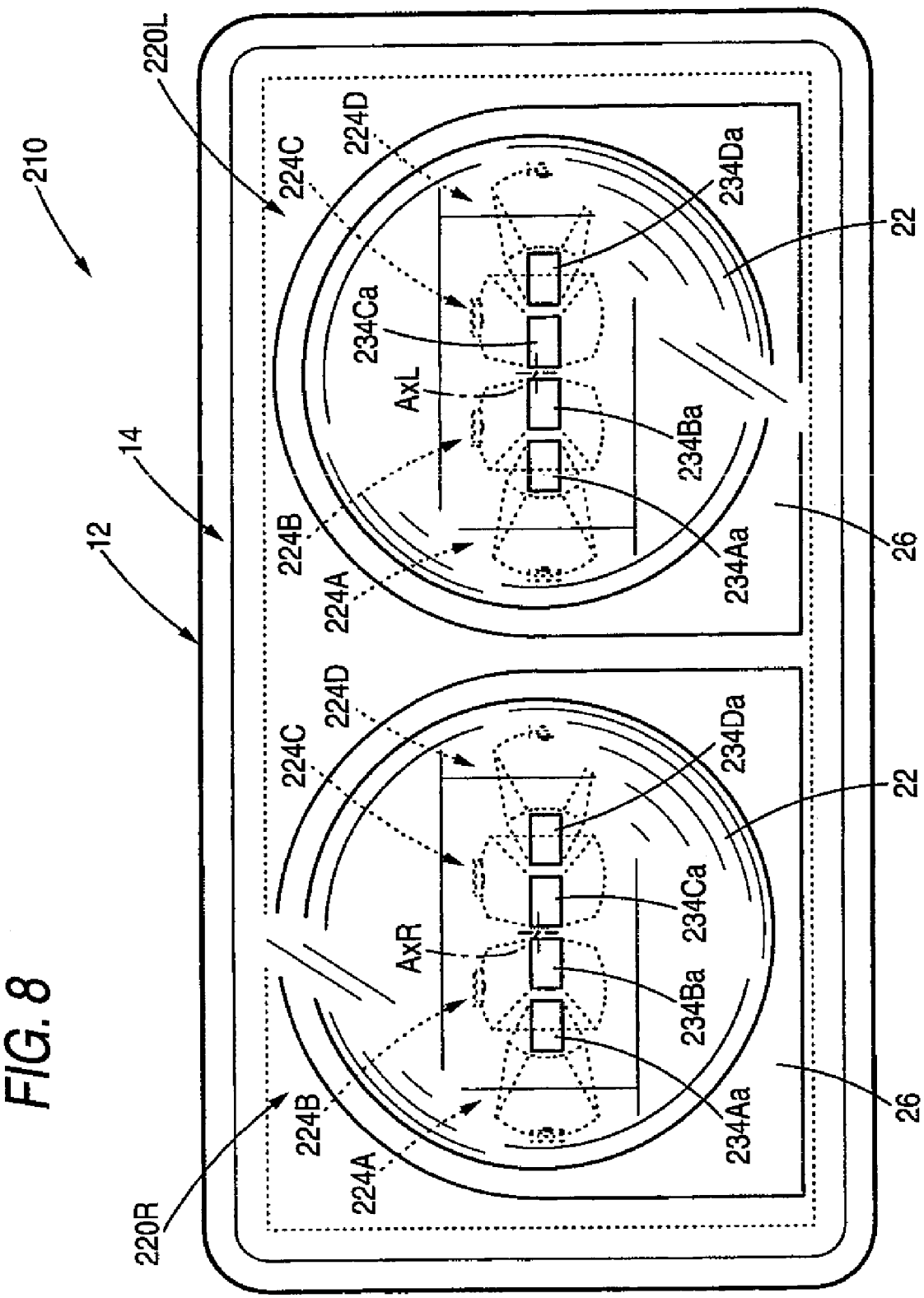
FIG. 8 is a front view showing a vehicle headlamp according to a second embodiment of the invention.

FIG. 8 is a front view showing a vehicle headlamp 210 according to this embodiment.

As is shown in FIG. 8, although a basic configuration thereof is similar to that of the vehicle headlamp 10 according to the first embodiment, a vehicle headlamp 210 according to this embodiment differs from the vehicle headlamp 10 of the first embodiment in configurations of four light source units 224A, 224B, 224C, 224D which are provided in each of two lamp units 220L, 220R accommodated in a lamp compartment thereof and directions of optical axes AxL, AxR of the lamp units 220L, 220R.

Namely, in this embodiment, lamp units having the same configuration will be used as the two lamp units 220L, 220R. The lamp unit 120L which is positioned on the left side is disposed in such a manner that its optical axis AxL extends to the front of the vehicle while being directed slightly to the right (specifically, directed to the right at an angle of the order of 1.5°), and the lamp unit 220R positioned on the right side is disposed in such a manner that its optical axis AxR extends to the front of the vehicle while being directed slightly to the left (specifically, directed to the left at an angle of the order of 1.5°).

In the respective light source units 224A, 224B, 224C, 224D which make up each of the lamp units 220L, 220R, although front end light output ports 234Aa, 234Ba, 234Ca, 234Da of light guiding members are formed into a rectangular shape as in the case with the first embodiment, the second embodiment differs from the first embodiment in that these four front end light output ports 234Aa, 234Ba, 234Ca, 234Da are all formed into the rectangular shape of the same size.

Namely, these front end light output ports 234Aa, 234Ba, 234Ca, 234Da are set to have a horizontal width of 8 millimeters and are formed at intervals of 2 millimeters. In addition, the optical axis AxL, AxR is positioned at the center between the front end light output port 234Ba and the front end light output port 234Ca. Note that this second embodiment is identical with the first embodiment in that the front end light outlet ports 234Aa, 234Ba, 234Ca, 234Da are set to have a vertical width of 4 millimeters and that their vertical center position are situated on the order of 1 millimeter downwards relative to a horizontal plane passing through the optical axis AxL, AxR.

Figure 9:
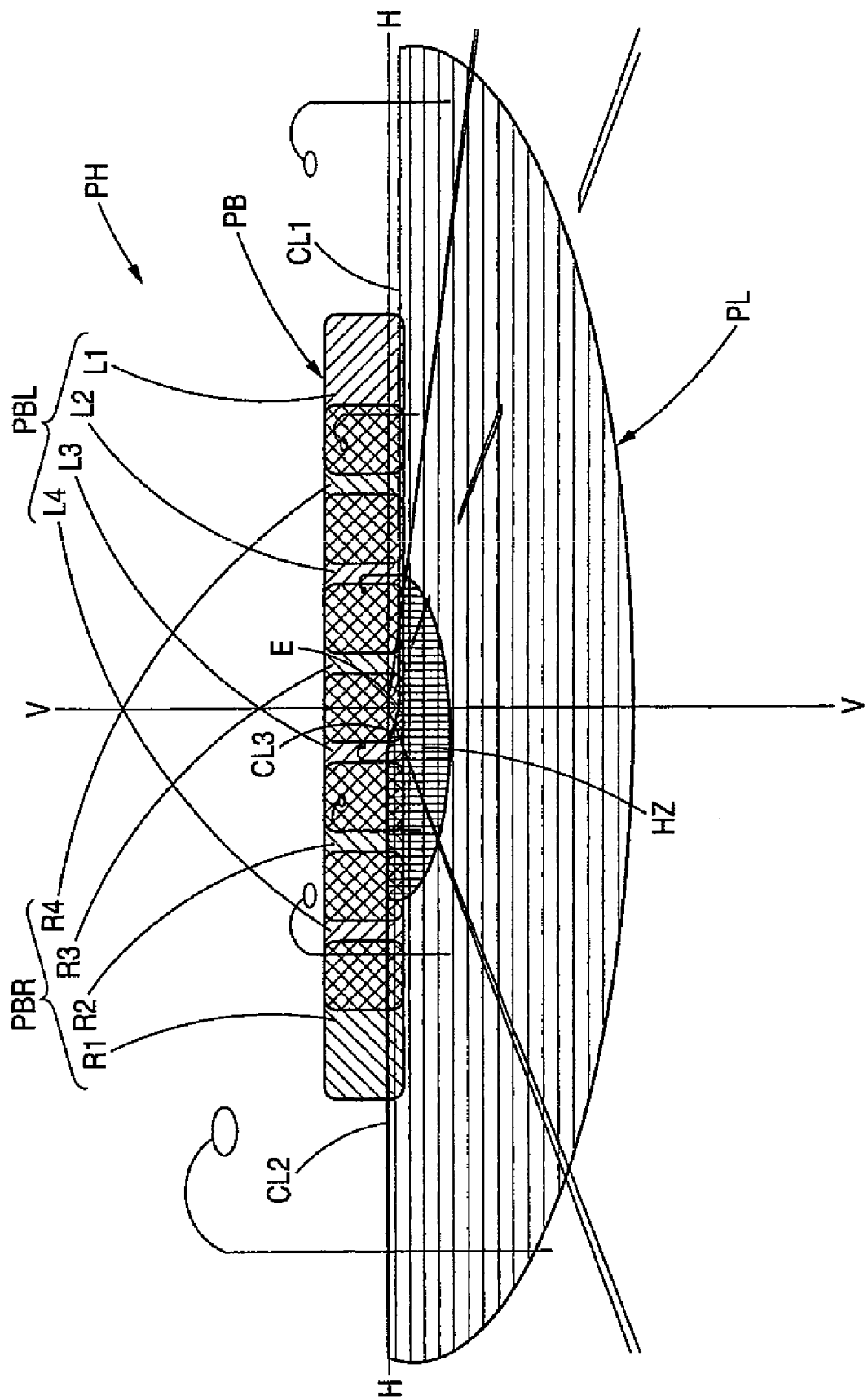
FIG. 9 is a perspective view showing an additional light distribution pattern formed on the imaginary vertical screen by light emitted forwards from a pair of lamp units of the vehicle headlamp according to the second embodiment, together with the low-beam light distribution pattern above.

FIG. 9 is a perspective view showing an additional light distribution pattern PB formed on an imaginary vertical screen disposed in a position at a distance of 25 m ahead of the vehicle by light emitted forwards from the lamp units 220L, 220R according to the embodiment together with a low-beam light distribution pattern PL formed by light emitted from other lamp units.

This additional light distribution pattern PB is made to be formed as a composite light distribution pattern of a unit light distribution pattern PBL formed by light emitted from the lamp unit 220L and a unit light distribution pattern PBR formed by light emitted from the lamp unit 220R.

Although these two unit light distribution patterns PBL, PBR are formed in the same shape because the two lamp units 220L, 220R have the same configuration as has been described above, because the lamp unit 220L positioned on the left side is disposed in such a manner that the axis AxL extends rightwards at the angle of the order of 1.5° and the lamp unit 220R positioned on the right side is disposed in such a manner that the axis AxR extends leftwards at the angle of the order of 1.5°, the two unit beams PBL, PBR are formed in a horizontally symmetrical positional relationship with respect to a line V-V. Next, the unit light distribution pattern PBR will be described.

This unit light distribution pattern PBR is made to be formed as a collection of four light distribution patterns R1, R2, R3, R4 which are formed in parallel in the horizontal direction by light from the four light source units 24A, 24B, 24C, 24D of the lamp unit 220R.

These four light distribution patterns R1, R2, R3, R4 are each formed into a substantially rectangular shape having a vertical width of the order of 4° and a horizontal width of the order of 8° and are arranged discretely in the horizontal direction at intervals of the order of 2° as inverted projected images of the four front end light output ports 234Aa, 234Ba, 234Ca, 234Da which are discretely disposed in the horizontal direction on the rear focal plane of the projection lens 22.

Because the optical axis AxR of the lamp unit 220R extends leftwards at the angle of the order of 1.5°, the unit light distribution pattern PBR is formed in such a manner that a center ling of the gap between the light distribution pattern R2 and the light distribution pattern R3 is positioned 1.5° to the left of the line V-V.

On the other hand, the unit light distribution pattern PBL is formed in a horizontally symmetrical positional relationship with the unit light distribution pattern PBR with respect to the line V-V, in the additional light distribution pattern PB which results from the combination of the two unit light distribution patterns, the four light distribution patterns R1, R2, R3, R4 which make up the unit light distribution pattern PBR are formed in such a manner as to be shifted half a pitch from four light distribution patterns L1, L2, L3, L4 which make up the unit light distribution pattern PBL.

This additional light distribution pattern PB is formed in such a manner that its vertical center position is situated on the order of 1° upwards relative to a line H-H and, hence, its lower end edge is situated on the order of 1° upwardly closer to the line H-H, so that the additional light distribution pattern PB slightly overlaps an oncoming vehicle lane side cut-off line CL1 of the low-beam light distribution pattern PL.

Also in this embodiment, although the high-beam light distribution pattern PH is made to be formed by the additional light distribution pattern PB being formed additionally to the low-beam light distribution pattern PL in such a state that the eight light distribution patterns L1, L2, L3, L4, R1, R2, R3, R4 which make up the additional light distribution pattern PB are all formed, in addition to this, a special low-beam light distribution pattern which has an increased visibility of the road surface ahead of the vehicle is made to be formed by selectively forming part of the additional light distribution pattern PB for addition to the lob-beam light distribution pattern PL (in other words, by not forming part of the additional light distribution pattern PB).

Hereinafter, the details of the light source unit illuminating/turning off control carried out in forming this special low-beam light distribution pattern will be described.

FIGS. 10A, 10B, and 10C show enlarged views showing part of FIG. 9 for the purpose of explaining the details of this light source illuminating/putting out control.

As is shown in FIG. 10A, when there is present an oncoming vehicle 2, which is running on an oncoming vehicle lane on the road surface ahead of the subject vehicle, this oncoming vehicle 2 running still distant from the subject vehicle, by turning off only the light source unit 224C of the lamp unit 220L and the light source unit 224C of the lamp unit 220R, in the eight light distribution patterns L1, L2, L3, L4, R1, R2, R3, R4 which make up the additional light distribution pattern PB, only the two light distribution patterns L3, R3 that are to be formed in the position where the oncoming vehicle 2 is present are made not to be formed.

Thereafter, as is shown in FIG. 10B, when the oncoming vehicle 2 is approaching the subject vehicle to some extent, by turning off the light source unit 224B of the lamp unit 220L and illuminating the light source unit 224C of the lamp unit 220L, in the eight light distribution patterns L1, L2, L3, L4, R1, R2, R3, R4 which make up the additional light distribution pattern PB, only the two light distribution patterns R3, L2 that are to be formed in the position where the oncoming vehicle 2 is present are made not to be formed.

Thereafter, as is shown in FIG. 10C, when the oncoming vehicle 2 is approaching the subject vehicle further, by turning off the light source unit 224D of the lamp unit 220R and illuminating the light source unit 224C of the lamp unit 220R, in the eight light distribution patterns L1, L2, L3, L4, R1, R2, R3, R4 which make up the additional light distribution pattern PB, only the two light distribution patterns L2, R4 that are to be formed in the position where the oncoming vehicle 2 is present are made not to be formed.

Thereafter, when the oncoming vehicle 2 is approaching the subject vehicle nearer than what is shown in FIG. 10C, by turning off the light source unit 224A of the lamp unit 220L and illuminating the light source unit 224B of the lamp unit 220L, in the eight light distribution patterns L1, L2, L3, L4, R1, R2, R3, R4 which make up the additional light distribution pattern PB, only the two light distribution patterns R4, L1 that are to be formed in the position where the oncoming vehicle 2 is present are made not to be formed.

In this way, by the respective light source units of the lamp units 220L, 220R being controlled to be illuminated or turned off so that only the light distribution patterns that are to be formed in the position where the oncoming vehicle 2 is present are made not to be formed sequentially, the visibility of the road surface lying ahead of the vehicle is increased sufficiently without dazzling the driver of the oncoming vehicle.

By adopting the configuration of this embodiment, the following functions and advantages can be obtained.

Namely, in the vehicle headlamp 210 of this embodiments because the two lamp units 220a, 220R are provided in each of which the front end light output ports 234Aa, 234Ba, 234Car 234Da of the light guiding members 234A, 234B, 234C, 234D of the light source units 224A, 224B, 224C, 224D are each formed into the rectangular shape of the same size and the lamp units 220L, 220R are disposed in such a manner that the directions of the optical axes AxL, AxR thereof are each offset the predetermined angle in the horizontal direction, gaps between the respective light distribution patterns L1, L2, L3, L4 which make up the unit light distribution pattern PBL formed by light emitted from the lamp unit 220L can be covered by the respective light distribution patterns R1, R2, R3, R4 which make up the unit light distribution pattern PBR formed by light emitted from the other lamp unit 220R, whereby the additional light distribution pattern PB which is formed as the light distribution pattern resulting from the combination of the two unit light distribution patterns PBL, PBR formed by light emitted from the two lamp units 220L, 220R can be formed as a continuous light distribution pattern having no dark portion.

In addition, also in this embodiment, by two of the eight light distribution patterns L1, L2, L3, L4, R1, R2, R3, R4 being made not to be formed sequentially, the position where the oncoming vehicle is present can be prevented from being illuminated, whereby the visibility of the road surface lying ahead of the subject vehicle can be enhanced without dazzling the driver of the oncoming vehicle. Moreover, this can be realized by the one type of headlamp.

In addition, in the second embodiment, while the four light distribution patterns L1, L2, L3, L4 which make up the unit light distribution pattern PBL and the four light distribution patterns R1, R2, R3, R4 which make up the unit light distribution pattern PBR have been described as being formed while the first group of light distribution patterns is shifted half a pitch from the second group of light distribution patterns, the light distribution patterns can be formed while being shifted any other amount than the amount above without departing from a range where the four light distribution patterns L1, L2, L3, L4 overlap each other partially.

While description has been made in connection with exemplary embodiments of the present invention, those skilled in the art will understand that various changes and modification may be made therein without departing from the present invention. For example, numerical values in the above description of the exemplary embodiments may, of course, be set to different values as is advantageous. It is aimed, therefore, to cover in the appended claims all such changes and modifications falling within the true spirit and scope of the present invention.

DESCRIPTION OF REFERENCE NUMERALS AND CHARACTERS 10, 210 vehicle headlamp; 12 lamp body; 14 light transmissive cover; 20L, 20R, 120R, 220L, 220R lamp unit; 22 projection lens; 24A, 24B, 24C, 24D, 124A, 124B, 124C, 124D, 224A, 224B, 224C, 224D light source unit; 26 holder; 32 light emitting device; 32a light emitting chip; 32b substrate; 34A, 34B, 34C, 34D, 134A, 134B, 134C, 134D light guiding member; 34Aa, 34Ba, 34Ca, 34Da, 134Aa, 134Ba, 134Ca, 134Da, 234Aa, 234Ba, 234Ca, 234Da front end light output port; 36A, 36B, 36C, 36D tubular member; 36a front wall; 36b positioning piece; 38A, 38B, 38C, 38D, 138A, 138B, 138C, 138D reflector as optical member; 40 support plate; 136A, 136B, 136C, 136D light transmissive member; Ax, AxL, AxR optical axis; CL1 oncoming vehicle lane side cut-off line; CL2 subject vehicle lane side cut-off line; CL3 oblique cut-off line; E elbow point; F rear focal point; HZ hot zone; L1, L2, L3, L4, R1, R2, R3, R4 light distribution pattern; PA, PB additional light distribution pattern; PAL, PAR, PBL, PBR unit light distribution pattern; PH high-beam light distribution pattern; PL low-beam light distribution pattern.

What is claimed is:

1. A lamp unit for a vehicle headlamp, the lamp unit comprising:
   a projection lens disposed on an optical axis extending in a longitudinal direction of a vehicle; and
   a plurality of light source units disposed rearwards of a rear focal plane of the projection lens,
   wherein each of the light source units comprises:
      a light emitting device; and
      a light guiding member having a front end light output port and adapted to guide light from the light emitting device to the front end light output port so as to allow the light be emitted from the front end light output port,
   wherein the front end light output ports of the light guiding members of the respective light source units are arranged adjacent to each other in a horizontal direction in a vicinity of the rear focal plane, and
   wherein each of the light guiding members comprises:
      a tubular member expanding in a substantially conical shape from the front end light output port towards a rear side, wherein a mirror finish treatment is applied on an inner circumferential surface of the tubular member and;
      an optical member disposed in a vicinity of a rear end portion of the tubular member and adapted to converge the light from the light emitting device towards the front end light output port.

2. The lamp unit according to claim 1, wherein each of the front end light output ports is formed into a substantially rectangular shape, and wherein horizontal widths of the front end light output ports are set larger than the front end light output ports that are positioned apart from the optical axis.

3. The lamp unit according to claim 1, wherein the plurality of light source units are horizontally arranged across the optical axis, and wherein respective horizontal widths of the front end light output ports and horizontal widths of gaps between the front end light output ports are set to be in a horizontally symmetrical positional relationship with respect to the optical axis.

4. The lamp unit according to claim 1, wherein at least one of the plurality of light source units is turned off based on detection of an oncoming vehicle.

5. A lamp unit for a vehicle headlamp, the lamp unit comprising:
   a projection lens disposed on an optical axis extending in a longitudinal direction of a vehicle; and
   a plurality of light source units disposed rearwards of a rear focal plane of the projection lens,
   wherein each of the light source units comprises:
      a light emitting device; and
      a light guiding member having a front end light output port and adapted to guide light from the light emitting device to the front end light output port so as to allow the light be emitted from the front end light output port,
   wherein the front end light output ports of the light guiding members of the respective light source units are arranged adjacent to each other in a horizontal direction in a vicinity of the rear focal plane, and
   wherein each of the light guiding members comprises:
      a light transmissive member expanding in a substantially conical shape from the front end light output port towards a rear side; and
      an optical member disposed in a vicinity of a rear end portion of the light transmissive member and adapted to converge the light from the light emitting device towards the front end light output port.

6. The lamp unit according to claim 5, wherein each of the front end light output ports is formed into a substantially rectangular shape, and wherein horizontal widths of the front end light output ports are set larger than the front end light output ports that are positioned apart from the optical axis.

7. The lamp unit according to claim 5, wherein the plurality of light source units are horizontally arranged across the optical axis, and wherein respective horizontal widths of the front end light output ports and horizontal widths of gaps between the front end light output ports are set to be in a horizontally symmetrical positional relationship with respect to the optical axis.

8. The vehicle headlamp according to claim 5, wherein at least one of the plurality of light source units is turned off based on detection of an oncoming vehicle.

9. A vehicle headlamp comprising:
   two lamp units each comprising:
      a projection lens disposed on an optical axis extending in a longitudinal direction of a vehicle; and
      a plurality of light source units disposed rearwards of a rear focal plane of the projection lens,
   wherein each of the light source units comprises:
      a light emitting device; and
      a light guiding member having a front end light output port and adapted to guide light from the light emitting device to the front end light output port so as to allow the light be emitted from the front end light output port,
   wherein the front end light output ports of the light guiding members of the respective light source units are arranged adjacent to each other in a horizontal direction in a vicinity of the rear focal plane, wherein the front end light output ports of the light guiding members of the respective light source units are formed into rectangular shapes whose sizes are substantially the same, wherein the respective lamp units are disposed in such a manner that directions of optical axes of the lamp units are offset at a predetermined angle in the horizontal direction, and wherein each of the light guiding members comprises:
- a tubular member expanding in a substantially conical shape from the front end light output port towards a rear side, wherein a mirror finish treatment is applied on an inner circumferential surface of the tubular member and;
- an optical member disposed in a vicinity of a rear end portion of the tubular member and adapted to converge the light from the light emitting device towards the front end light output port.

10. The vehicle headlamp according to claim 9, wherein at least one of the plurality of light source units is turned off based on detection of an oncoming vehicle.

11. A vehicle headlamp comprising:
two lamp units each comprising:
- a projection lens disposed on an optical axis extending in a longitudinal direction of a vehicle; and
- a plurality of light source units disposed rearwards of a rear focal plane of the projection lens, wherein each of the light source units comprises:
- a light emitting device; and
- a light guiding member having a front end light output port and adapted to guide light from the light emitting device to the front end light output port so as to allow the light be emitted from the front end light output port, wherein the front end light output ports of the light guiding members of the respective light source units are arranged adjacent to each other in a horizontal direction in a vicinity of the rear focal plane, wherein the plurality of light source units are horizontally arranged across the optical axis, wherein respective horizontal widths of the front end light output ports and horizontal widths of gaps between the front end light output ports are set to be in a horizontally symmetrical positional relationship with respect to the optical axis, wherein shapes of the two lamp units are horizontally symmetrical with respect to each other, wherein the respective lamp units are disposed in such a manner that directions of optical axes thereof are aligned with each other, and wherein each of the light guiding members comprises:
- a tubular member expanding in a substantially conical shape from the front end light output port towards a rear side, wherein a mirror finish treatment is applied on an inner circumferential surface of the tubular member and;
- an optical member disposed in a vicinity of a rear end portion of the tubular member and adapted to converge the light from the light emitting device towards the front end light output port.

12. The vehicle headlamp according to claim 11, wherein at least one of the plurality of light source units is turned off based on detection of an oncoming vehicle.

* * * * *